(12) United States Patent
Fukumitsu et al.

(10) Patent No.: US 8,551,817 B2
(45) Date of Patent: Oct. 8, 2013

(54) SEMICONDUCTOR SUBSTRATE CUTTING METHOD

(75) Inventors: Kenshi Fukumitsu, Hamamatsu (JP);
Fumitsugu Fukuyo, Hamamatsu (JP);
Naoki Uchiyama, Hamamatsu (JP);
Ryuji Sugiura, Hamamatsu (JP);
Kazuhiro Atsumi, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 188 days.

(21) Appl. No.: 13/269,274

(22) Filed: Oct. 7, 2011

(65) Prior Publication Data

US 2012/0077315 A1 Mar. 29, 2012

Related U.S. Application Data

(63) Continuation of application No. 12/603,145, filed on Oct. 21, 2009, now Pat. No. 8,058,103, which is a continuation of application No. 10/571,142, filed as application No. PCT/JP2004/013163 on Sep. 9, 2004, now abandoned.

(30) Foreign Application Priority Data

Sep. 10, 2003 (JP) ................................ 2003-318875
Jul. 21, 2004 (JP) ................................ 2004-213499

(51) Int. Cl.
*H01L 21/00* (2006.01)
(52) U.S. Cl.
USPC ..... 438/110; 438/114; 438/465; 257/E21.599
(58) Field of Classification Search
USPC .................. 438/110, 114, 465; 257/E21.599
See application file for complete search history.

(56) References Cited

U.S. PATENT DOCUMENTS 3,610,871 A 10/1971 Lumley
(Continued)

FOREIGN PATENT DOCUMENTS

| CN | 1160228 A | 9/1997 |
|----|-----------|--------|
| EP | 0 863 231 | 9/1998 |

(Continued)

OTHER PUBLICATIONS

X. Liu et al., "Laser Ablation and Micromachining with Ultrashort Laser Pulses," IEEE Journal of Quantum Electronics, vol. 33, No. 10, Oct. 1997, pp. 1706-1716.
A. Ishii et al., CO2 Laser Processing Technology, Nikkan Kogyo Publishing Production, Dec. 21, 1992, pp. 63-65 (with partial English translation).
"New Laser Handbook" published by Asakusa Shoten, Jun. 15, 1989, pp. 666-669, including English language translation.

(Continued)

*Primary Examiner* — Daniel Whalen
(74) *Attorney, Agent, or Firm* — Drinker Biddle & Reath LLP

(57) ABSTRACT

A wafer having a front face formed with a functional device is irradiated with laser light while positioning a light-converging point within the wafer with the rear face of the wafer acting as a laser light incident face, so as to generate multiphoton absorption, thereby forming a starting point region for cutting due to a molten processed region within the wafer along a line. Consequently, a fracture can be generated from the starting point region for cutting naturally or with a relatively small force, so as to reach the front face and rear face. Therefore, when an expansion film is attached to the rear face of the wafer by way of a die bonding resin layer after forming the starting point region for cutting and then expanded, the wafer and die bonding resin layer can be cut along the line.

12 Claims, 23 Drawing Sheets

(56) References Cited

U.S. PATENT DOCUMENTS

| | | |
|---|---|---|
| 3,626,141 A | 12/1971 | Daly |
| 3,629,545 A | 12/1971 | Graham et al. |
| 3,790,051 A | 2/1974 | Moore |
| 4,242,152 A | 12/1980 | Stone |
| 4,531,060 A | 7/1985 | Suwa et al. |
| 4,546,231 A | 10/1985 | Gresser et al. |
| 4,562,333 A | 12/1985 | Taub et al. |
| 5,211,805 A | 5/1993 | Srinivasan |
| 5,230,184 A | 7/1993 | Bukhman |
| 5,254,833 A | 10/1993 | Okiyama |
| 5,543,365 A | 8/1996 | Wills et al. |
| 5,622,540 A | 4/1997 | Stevens |
| 5,637,244 A | 6/1997 | Erokhin |
| 5,656,186 A | 8/1997 | Mourou et al. |
| 5,776,220 A | 7/1998 | Allaire et al. |
| 5,826,772 A | 10/1998 | Ariglio et al. |
| 5,841,543 A | 11/1998 | Guldi et al. |
| 5,925,271 A | 7/1999 | Pollack et al. |
| 5,968,382 A | 10/1999 | Matsumoto et al. |
| 5,976,392 A | 11/1999 | Chen |
| 6,031,201 A | 2/2000 | Amako et al. |
| 6,055,829 A | 5/2000 | Witzmann et al. |
| 6,175,096 B1 | 1/2001 | Nielsen |
| 6,181,728 B1 | 1/2001 | Cordingley et al. |
| 6,211,488 B1 | 4/2001 | Hoekstra et al. |
| 6,252,197 B1 | 6/2001 | Hoekstra et al. |
| 6,257,224 B1 | 7/2001 | Yoshino et al. |
| 6,259,058 B1 | 7/2001 | Hoekstra |
| 6,285,002 B1 | 9/2001 | Ngoi et al. |
| 6,322,958 B1 | 11/2001 | Hayashi |
| 6,325,855 B1 | 12/2001 | Sillmon et al. |
| 6,420,678 B1 | 7/2002 | Hoekstra |
| 6,489,588 B1 | 12/2002 | Hoekstra et al. |
| 6,756,562 B1 * | 6/2004 | Kurosawa et al. ........ 219/121.67 |
| 6,992,026 B2 | 1/2006 | Fukuyo et al. |
| 7,396,742 B2 | 7/2008 | Fukuyo et al. |
| 7,489,454 B2 | 2/2009 | Fukuyo et al. |
| 7,547,613 B2 | 6/2009 | Fukuyo et al. |
| 7,566,635 B2 | 7/2009 | Fujii et al. |
| 7,592,237 B2 | 9/2009 | Sakamoto et al. |
| 7,592,238 B2 | 9/2009 | Fukuyo et al. |
| 7,605,344 B2 | 10/2009 | Fukumitsu |
| 7,608,214 B2 | 10/2009 | Kuno et al. |
| 7,615,721 B2 | 11/2009 | Fukuyo et al. |
| 7,626,137 B2 | 12/2009 | Fukuyo et al. |
| 7,709,767 B2 | 5/2010 | Sakamoto |
| 7,718,510 B2 | 5/2010 | Sakamoto et al. |
| 7,719,017 B2 | 5/2010 | Tanaka |
| 7,732,730 B2 | 6/2010 | Fukuyo et al. |
| 7,749,867 B2 | 7/2010 | Fukuyo et al. |
| 7,754,583 B2 | 7/2010 | Sakamoto |
| 7,825,350 B2 | 11/2010 | Fukuyo et al. |
| 7,897,487 B2 | 3/2011 | Sugiura et al. |
| 7,902,636 B2 | 3/2011 | Sugiura et al. |
| 7,939,430 B2 | 5/2011 | Sakamoto et al. |
| 7,947,574 B2 | 5/2011 | Sakamoto et al. |
| 2002/0006765 A1 | 1/2002 | Michel et al. |
| 2002/0115235 A1 * | 8/2002 | Sawada ........................ 438/113 |
| 2002/0170896 A1 | 11/2002 | Choo et al. |
| 2003/0024909 A1 | 2/2003 | Hoekstra et al. |
| 2003/0077879 A1 | 4/2003 | Ohno et al. |
| 2003/0190795 A1 | 10/2003 | Kawakami |
| 2004/0002199 A1 | 1/2004 | Fukuyo et al. |
| 2004/0266138 A1 * | 12/2004 | Kajiyama et al. ............. 438/462 |
| 2005/0184037 A1 | 8/2005 | Fukuyo et al. |
| 2005/0189330 A1 | 9/2005 | Fukuyo et al. |
| 2005/0202596 A1 | 9/2005 | Fukuyo et al. |
| 2005/0272223 A1 | 12/2005 | Fujii et al. |
| 2006/0040473 A1 | 2/2006 | Fukuyo et al. |
| 2006/0144828 A1 | 7/2006 | Fukumitsu et al. |
| 2006/0148212 A1 | 7/2006 | Fukuyo et al. |
| 2006/0255024 A1 | 11/2006 | Fukuyo et al. |
| 2007/0085099 A1 | 4/2007 | Fukumitsu et al. |
| 2007/0125757 A1 | 6/2007 | Fukuyo et al. |
| 2007/0158314 A1 | 7/2007 | Fukumitsu et al. |
| 2007/0252154 A1 | 11/2007 | Uchiyama et al. |
| 2008/0035611 A1 | 2/2008 | Kuno et al. |
| 2008/0037003 A1 | 2/2008 | Atsumi et al. |
| 2008/0090382 A1 | 4/2008 | Fujii et al. |
| 2008/0218735 A1 | 9/2008 | Atsumi et al. |
| 2008/0251506 A1 | 10/2008 | Atsumi et al. |
| 2009/0008373 A1 | 1/2009 | Muramatsu et al. |
| 2009/0032509 A1 | 2/2009 | Kuno et al. |
| 2009/0098713 A1 | 4/2009 | Sakamoto |
| 2009/0107967 A1 | 4/2009 | Sakamoto et al. |
| 2009/0117712 A1 | 5/2009 | Sakamoto et al. |
| 2009/0166342 A1 | 7/2009 | Kuno et al. |
| 2009/0166808 A1 | 7/2009 | Sakamoto et al. |
| 2009/0250446 A1 | 10/2009 | Sakamoto |
| 2009/0261083 A1 | 10/2009 | Osajima et al. |
| 2009/0302428 A1 | 12/2009 | Sakamoto et al. |
| 2010/0006548 A1 | 1/2010 | Atsumi et al. |
| 2010/0009547 A1 | 1/2010 | Sakamoto |
| 2010/0012632 A1 | 1/2010 | Sakamoto |
| 2010/0012633 A1 | 1/2010 | Atsumi et al. |
| 2010/0015783 A1 | 1/2010 | Fukuyo et al. |
| 2010/0025386 A1 | 2/2010 | Kuno et al. |
| 2010/0032418 A1 | 2/2010 | Kuno et al. |
| 2010/0055876 A1 | 3/2010 | Fukuyo et al. |
| 2010/0151202 A1 | 6/2010 | Fukumitsu |
| 2010/0176100 A1 | 7/2010 | Fukuyo et al. |
| 2010/0184271 A1 | 7/2010 | Sugiura et al. |
| 2010/0200550 A1 | 8/2010 | Kumagai |
| 2010/0203678 A1 | 8/2010 | Fukumitsu et al. |
| 2010/0203707 A1 | 8/2010 | Fujii et al. |
| 2010/0227453 A1 | 9/2010 | Sakamoto |
| 2010/0240159 A1 | 9/2010 | Kumagai et al. |
| 2010/0258539 A1 | 10/2010 | Sakamoto |
| 2010/0301521 A1 | 12/2010 | Uchiyama |
| 2010/0311313 A1 | 12/2010 | Uchiyama |
| 2010/0327416 A1 | 12/2010 | Fukumitsu |
| 2011/0000897 A1 | 1/2011 | Nakano et al. |
| 2011/0001220 A1 | 1/2011 | Sugiura et al. |
| 2011/0021004 A1 | 1/2011 | Fukuyo et al. |
| 2011/0027971 A1 | 2/2011 | Fukuyo et al. |
| 2011/0027972 A1 | 2/2011 | Fukuyo et al. |
| 2011/0037149 A1 | 2/2011 | Fukuyo et al. |
| 2011/0274128 A1 | 11/2011 | Fukumitsu et al. |

FOREIGN PATENT DOCUMENTS

| | | |
|---|---|---|
| EP | 1 026 735 | 8/2000 |
| JP | 46-24989 | 7/1971 |
| JP | 59-130438 | 7/1984 |
| JP | 59-141233 | 8/1984 |
| JP | 60-055640 | 3/1985 |
| JP | 60-144985 | 7/1985 |
| JP | 61-112345 | 5/1986 |
| JP | 61-121453 | 9/1986 |
| JP | 62-004341 | 1/1987 |
| JP | 64-038209 | 2/1989 |
| JP | 03-234043 | 10/1991 |
| JP | 03-276662 | 12/1991 |
| JP | 04-029352 | 1/1992 |
| JP | 04-111800 | 4/1992 |
| JP | 04-188847 | 7/1992 |
| JP | 04-300084 | 10/1992 |
| JP | 04-356942 | 12/1992 |
| JP | 05-335726 | 12/1993 |
| JP | 06-188310 | 7/1994 |
| JP | 07-037840 | 2/1995 |
| JP | 07-040336 | 2/1995 |
| JP | 07-263382 | 10/1995 |
| JP | 08-197271 | 8/1996 |
| JP | 08-264488 | 10/1996 |
| JP | 09-017756 | 1/1997 |
| JP | 09-017831 | 1/1997 |
| JP | 09-260310 | 10/1997 |
| JP | 09-263734 | 10/1997 |
| JP | 10-071483 | 3/1998 |
| JP | 10-163780 | 6/1998 |
| JP | 10-214997 | 8/1998 |
| JP | 10-233373 | 9/1998 |
| JP | 10-305420 | 11/1998 |

(56) References Cited

FOREIGN PATENT DOCUMENTS

| | | |
|---|---|---|
| JP | 11-071124 | 3/1999 |
| JP | 11-121517 | 4/1999 |
| JP | 11-138896 | 5/1999 |
| JP | 11-156564 | 6/1999 |
| JP | 11-162889 | 6/1999 |
| JP | 11-163097 | 6/1999 |
| JP | 11-163403 | 6/1999 |
| JP | 11-177137 | 7/1999 |
| JP | 11-221684 | 8/1999 |
| JP | 11-267861 | 10/1999 |
| JP | 2000-015467 | 1/2000 |
| JP | 2000-042764 | 2/2000 |
| JP | 2000-104040 | 4/2000 |
| JP | 2000-124537 | 4/2000 |
| JP | 2000-158156 | 6/2000 |
| JP | 2000-195828 | 7/2000 |
| JP | 2000-210785 | 8/2000 |
| JP | 2000-216114 | 8/2000 |
| JP | 2000-219528 | 8/2000 |
| JP | 2000-237885 | 9/2000 |
| JP | 2000-237886 | 9/2000 |
| JP | 2001-127015 | 5/2001 |
| JP | 2001-250798 | 9/2001 |
| JP | 2001-326194 | 11/2001 |
| JP | 2002-050589 | 2/2002 |
| JP | 2002-158276 | 5/2002 |
| JP | 2002-192367 | 7/2002 |
| JP | 2002-192368 | 7/2002 |
| JP | 2002-192369 | 7/2002 |
| JP | 2002-192370 | 7/2002 |
| JP | 2002-192371 | 7/2002 |
| JP | 2002-205181 | 7/2002 |
| JP | 2002-224878 | 8/2002 |
| JP | 2002-226796 | 8/2002 |
| JP | 2003-001458 | 1/2003 |
| JP | 2003-334812 | 11/2003 |
| JP | 2003-338467 | 11/2003 |
| JP | 2004-001076 | 1/2004 |
| JP | 2005-001001 | 1/2005 |
| JP | 2005-047290 | 2/2005 |
| JP | 2005-159378 | 6/2005 |
| JP | 2005-159379 | 6/2005 |
| JP | 2005-313237 | 11/2005 |
| JP | 2006-128723 | 5/2006 |
| JP | 2006-135355 | 5/2006 |
| KR | 2001-017690 | 3/2001 |
| TW | 165354 | 8/1991 |
| TW | 192484 | 10/1992 |
| TW | 219906 | 2/1994 |
| WO | WO 01/90709 | 11/2001 |
| WO | WO 02/07927 | 1/2002 |
| WO | WO 02/22301 | 3/2002 |
| WO | WO 03/076118 | 9/2003 |
| WO | WO 2004/082006 | 9/2004 |

OTHER PUBLICATIONS

Tooling Machine Series, "Laser Machining" published by Taiga Shuppan Inc., 1990, pp. 91-96, including English language translation.

"Stealth Dicing, It's Principles and Features: A Technology Most Suitable for Dicing Very Thin Semiconductor Wafers" published by Takaoka Hidetsugu, Electronic Material No. 9, 2002, pp. 17-21, including English language translation.

Journal of the Japan Society of Griding Engineers, vol. 47, No. 5, May 2003, pp. 229-231, including English language translation.

T. Miyazaki, "Laser Beam Machining Technology," Published by Sangyo-Tosho Inc., May 31, 1991, First Edition. pp. 9-10, including English language translation.

F. Fukuyo et al., "Stealth Dicing Technology for Ultra Thin Wafer", presented at 2003 ICEP (International Conference on Electronics Packaging), Apr. 16-18, 2003, Tokyo, Japan.

K. Midorikawa. "Recent Progress of Femtosecond Lasers and Their Applications to Material Processing", Dai 45 Kai Laser Netsukako Kenkyukai Ronbunshu, Dec. 1998, pp. 29-38, including English language translation.

T. Sano et al., "Ultrashort Pulse Laser Microprocessing of Silicon", Japan Welding Society Zenkoku Taikai Koen Gaiyo, Mar. 2000, pp. 72-73, including English language translation.

K. Miura et al., "Formation of Photo-induced Structures in Glasses with Femtosecond Laser," Dai 42 Kai Laser Netsukako Kenkyukai Ronbunshu, Nov. 1997, pp. 107, line 4 to pp. 109, line 5.

K. Hayashi, "Inner Glass Marking by Harmonics of Solid-state Laser", Dai 45 Kai Laser Netsukako Kenkyukai Ronbunshu, Dec. 1998, pp. 23-28.

"Proceedings of the 63$^{rd}$ Laser Materials Processing Conference", May 2005, pp. 115-123.

The 6$^{th}$ International Symposium on Laser Precision Microfabrication, Apr. 2005.

"Journal of Japan Laser Processing Society", vol. 12, No. 1, Feb. 2005, pp. 17-23, including English language translation.

U.S. Appl. No. 13/206,181, filed Aug. 9, 2011.
U.S. Appl. No. 13/235,936, filed Sep. 19, 2011.
U.S. Appl. No. 13/213,175, filed Aug. 19, 2011.
U.S. Appl. No. 13/233,662, filed Sep. 15, 2011.
U.S. Appl. No. 13/061,438, filed Apr. 26, 2011.
U.S. Appl. No. 13/107,056, filed May 13, 2011.
U.S. Appl. No. 13/151,877, filed Jun. 2, 2011.
U.S. Appl. No. 13/131,429, filed Jun. 28, 2011.
U.S. Appl. No. 13/143,636, filed Sep. 21, 2011.
U.S. Appl. No. 13/148,097, filed Aug. 26, 2011.
U.S. Appl. No. 13/262,995, filed Oct. 5, 2011.
U.S. Appl. No. 13/265,027, filed Oct. 18, 2011.

* cited by examiner

*Fig.11*
(a)
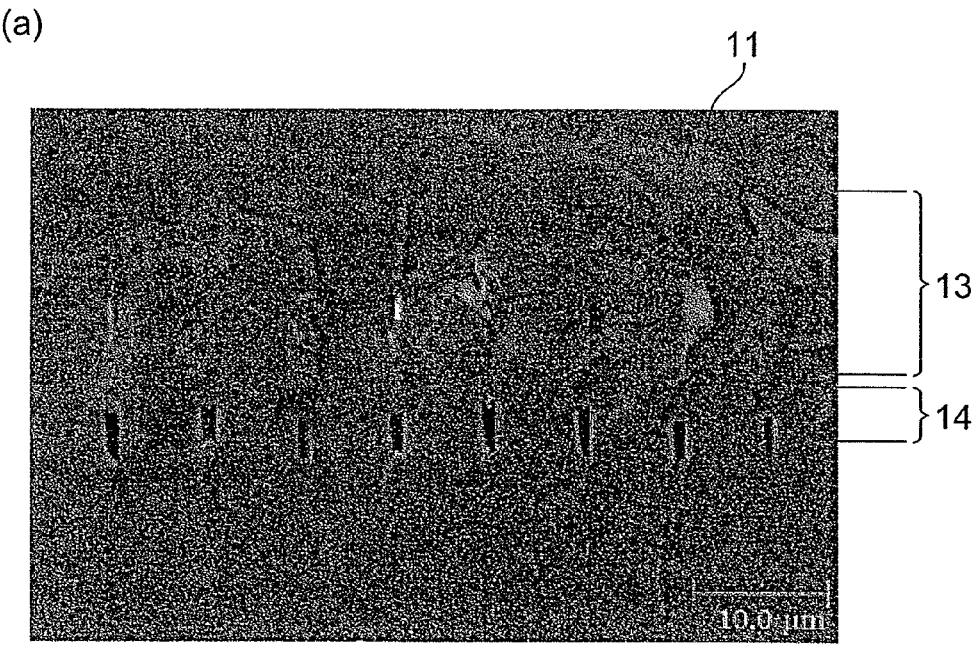
(b)
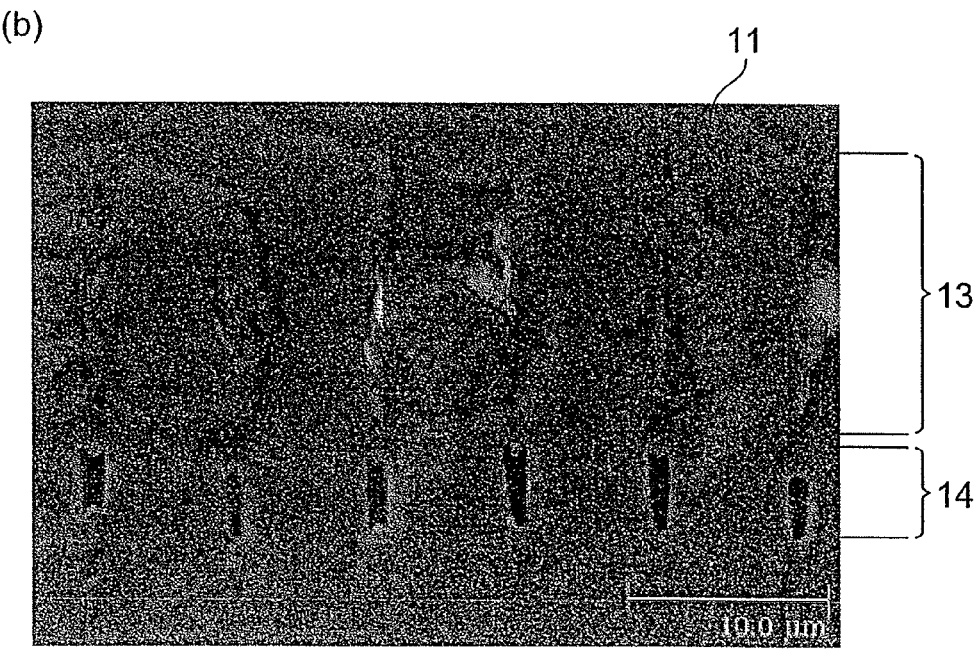

Fig.17
(a)
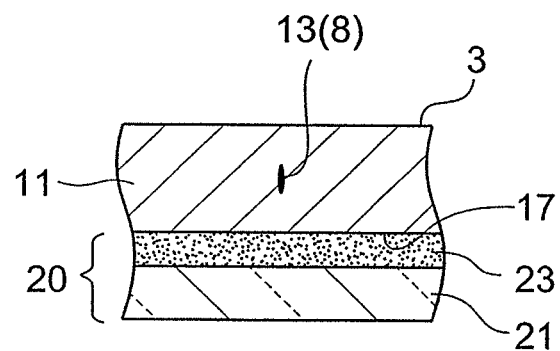
(b)
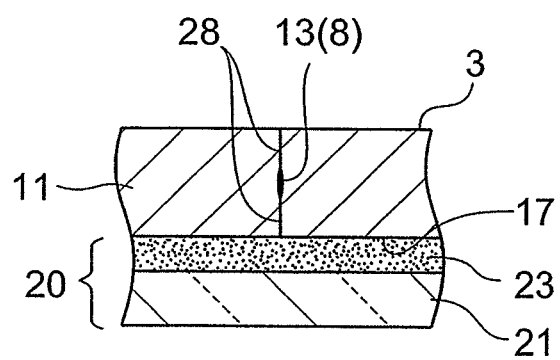

Fig.18
(a)
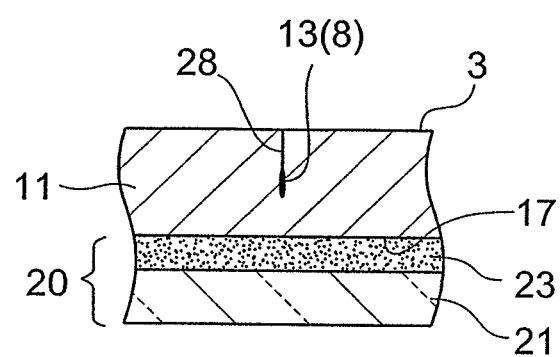
(b)
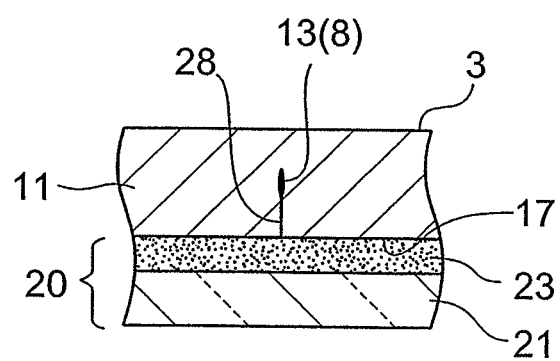

Fig.21
(a)
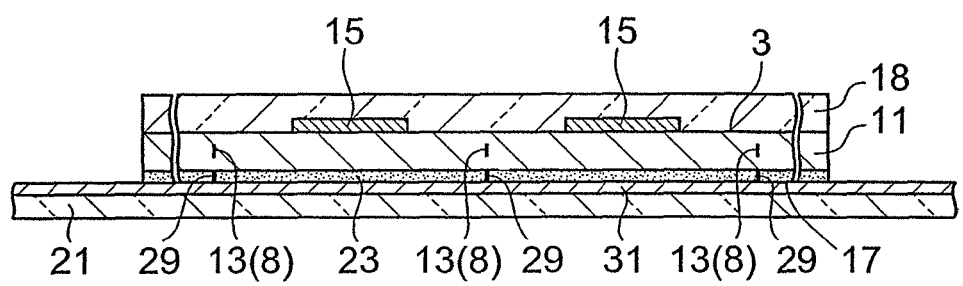
(b)
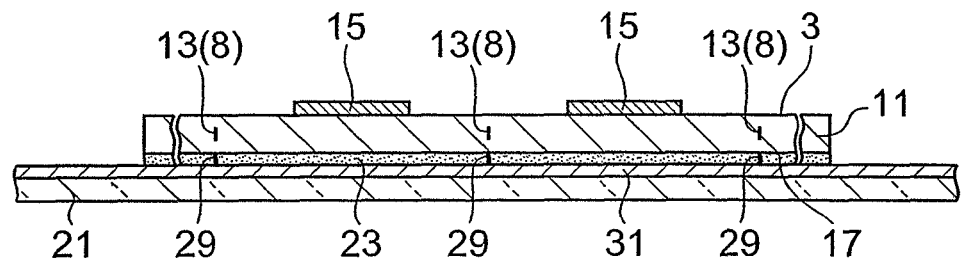
(c)
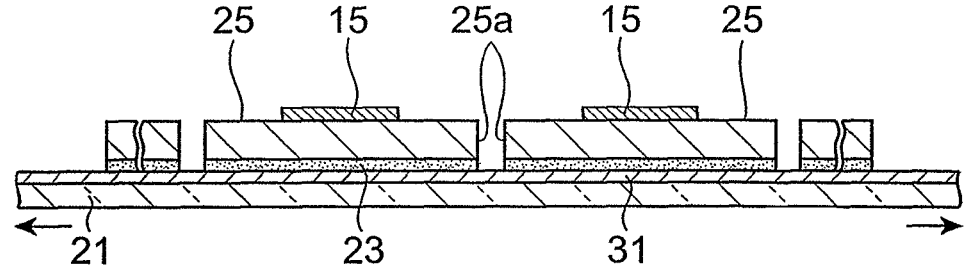

SEMICONDUCTOR SUBSTRATE CUTTING METHOD

TECHNICAL FIELD

The present invention relates to a semiconductor substrate cutting method used for cutting a semiconductor substrate having a front face formed with a functional device in a process of making a semiconductor device and the like.

BACKGROUND ART

As a conventional technique of this kind, Patent Document 1 and Patent Document 2 disclose the following technique. First, an adhesive sheet is attached to the rear face of a semiconductor wafer by way of a die bonding resin, and a blade cuts the semiconductor wafer while the semiconductor wafer is held on the adhesive sheet, so as to yield semiconductor chips. When picking up the semiconductor chips on the adhesive sheet, the die bonding resin is peeled off together with the individual semiconductor chips. This can bond each semiconductor chip onto a lead frame while saving steps such as the step of applying an adhesive to the rear face of the semiconductor chip.

Patent Document 1: Japanese Patent Application Laid-Open No. 2002-158276

Patent Document 2: Japanese Patent Application Laid-Open No. 2000-104040

DISCLOSURE OF THE INVENTION

Problem to be Solved by the Invention

However, when cutting the semiconductor wafer held on the adhesive sheet with a blade, it is necessary for techniques such as the one mentioned above to reliably cut the die bonding resin layer existing between the semiconductor wafer and the adhesive sheet without cutting the adhesive sheet. Therefore, care must be taken in particular when cutting the semiconductor wafer with a blade in such a case.

In view of such circumstances, it is an object of the present invention to provide a semiconductor substrate cutting method which can efficiently cut a semiconductor substrate having a front face formed with a functional device together with a die bonding resin layer.

Means for Solving Problem

For achieving the above-mentioned object, the present invention provides a semiconductor substrate cutting method for cutting a semiconductor substrate having a front face formed with a functional device along a line along which the substrate should be cut, the method comprising the steps of irradiating the semiconductor substrate with laser light while positioning a light-converging point within the semiconductor substrate with a rear face of the semiconductor substrate acting as a laser light incident face, so as to form a modified region, and causing the modified region to form a starting point region for cutting along the line along which the substrate should be cut inside by a predetermined distance from the laser light incident face; and attaching an expandable holding member to a rear face of the semiconductor substrate by way of a die bonding resin layer after forming the starting point region for cutting; and cutting the semiconductor substrate and die bonding resin layer along the line along which the substrate should be cut by expanding the holding member after attaching the holding member.

A semiconductor substrate having a front face formed with a functional device is an object to be processed in this semiconductor substrate cutting method. Such a semiconductor substrate is irradiated with laser light while positioning a light-converging point within the semiconductor substrate with the rear face of the semiconductor substrate acting as a laser light incident face, whereby multiphoton absorption or optical absorption equivalent thereto, for example, is generated, and a starting point region for cutting due to the modified region is formed within the semiconductor substrate along the line along which the substrate should be cut. Here, the rear face of the semiconductor substrate is employed as the laser light incident face, since there is a fear of the functional device restraining laser light from entering when the front face is used as the laser light incident face. When the starting point region for cutting is formed within the semiconductor substrate as such, a fracture can be generated from the starting point region for cutting acting as a start point naturally or with a relatively small force applied thereto, so as to reach the front face and rear face of the semiconductor substrate. Therefore, after the starting point region for cutting is formed, an expandable holding member is attached to the rear face of the semiconductor substrate by way of a die bonding resin layer and then is expanded, whereby cut surfaces of the semiconductor substrate cut along the line along which the substrate should be cut are released from their close contact state as the holding member expands. This also cuts the die bonding resin layer existing between the semiconductor substrate and holding member along the line along which the substrate should be cut. Hence, the semiconductor substrate and die bonding resin layer can be cut along the line along which the substrate should be cut much more efficiently than in the case cut with a blade. Also, since the cut surfaces of the semiconductor substrate cut along the line along which the substrate should be cut are initially in close contact with each other, the cut individual pieces of the semiconductor substrate and the cut individual pieces of the die bonding resin layer have substantially the same outer shape, whereby the die bonding resin can be prevented from protruding from the cut surface of each piece of the semiconductor substrate.

Here, the starting point region for cutting refers to a region to become a cut start point when the semiconductor substrate is cut. The starting point region for cutting may be, formed when a modified region is formed continuously or intermittently. The functional device refers to semiconductor active layers formed by crystal growth, light-receiving devices such as photodiodes, light-emitting devices such as laser diodes, and circuit devices formed as circuits, for example.

Preferably, the method further comprises the step of grinding the rear face of the semiconductor substrate such that the semiconductor substrate attains a predetermined thickness before forming the starting point region for cutting. When the rear face of the semiconductor substrate is thus ground beforehand such that the semiconductor substrate attains a predetermined thickness, the semiconductor substrate and die bonding resin layer can be cut more accurately along the line along which the substrate should be cut. Here, the grinding encompasses cutting, polishing, chemical etching, etc.

The modified region may include a molten processed region. When the object to be processed is a semiconductor substrate, a molten processed region may be formed upon irradiation with laser light. Since this molten processed region is an example of the above-mentioned modified region, the semiconductor substrate can be cut easily in this case as well, whereby the semiconductor substrate and die bonding resin layer can be cut efficiently along the line along which the substrate should be cut.

The modified region may include a molten processed region and a minute void positioned on the opposite side of the molten processed region from the laser light incident face. When the object to be processed is a semiconductor substrate, the molten processed region and minute void may be formed upon irradiation with laser light. Since the molten processed region and minute void constitute an example of the modified region, the semiconductor substrate can easily be cut in this case as well, whereby the semiconductor substrate and die bonding resin layer can efficiently be cut along the line along which the substrate should be cut.

When forming the starting point region for cutting in the semiconductor substrate cutting method in accordance with the present invention explained in the foregoing, a fracture may be allowed to reach the front face of the semiconductor substrate from the starting point region for cutting acting as a start point, the rear face of the semiconductor from the starting point region for cutting acting as a start point, or the front face and rear face of the semiconductor substrate from the starting point region for cutting acting as a start point.

Preferably, the method further comprises the step of heating the die bonding resin layer before the step of cutting the semiconductor substrate and die bonding resin layer along the line along which the substrate should be cut by expanding the holding member. When the die bonding resin layer is heated before expanding the holding member, the die bonding resin layer can be cut more accurately and easily along the line along which the substrate should be cut by expanding the holding member.

Effect of the Invention

In the present invention, a semiconductor substrate having a front face formed with a functional device can efficiently be cut together with a die bonding resin layer.

BRIEF DESCRIPTION OF THE DRAWINGS

FIG. 11 is a view showing photographs of a cut section of a silicon wafer formed with molten processed regions and minute voids by the laser processing method in accordance with this embodiment;

FIG. 17 is a schematic view showing the relationship between the silicon wafer and the starting point region for cutting in the semiconductor substrate cutting method in accordance with the embodiment, in which (a) and (b) illustrate respective states where no fracture is generated from the starting point region for cutting acting as a start point, and a fracture from the starting point region for cutting acting as a start point reaches the front face and rear face of the silicon wafer;

FIG. 18 is a schematic view showing the relationship between the silicon wafer and the starting point region for cutting in the semiconductor substrate cutting method in accordance with the embodiment, in which (a) and (b) illustrate respective states where a fracture from the starting point region for cutting acting as a start point reaches the front face of the silicon wafer, and a fracture from the starting point region for cutting acting as a start point reaches the rear face of the silicon wafer;

FIG. 21 is a schematic view for explaining the specific example of the semiconductor substrate cutting method in accordance with the embodiment, in which (a), (b), and (c) illustrate respective states where an expansion film is attached to the die bonding layer by way of an adhesive layer, the protective film is peeled off from the silicon wafer, and the expansion film is expanded;

EXPLANATIONS OF NUMERALS

1 . . . semiconductor substrate; 3 . . . front face; 5 . . . line along which the semiconductor substrate should be cut; 7 . . . modified region; 8 . . . starting point region for cutting; 11 . . . silicon wafer (semiconductor substrate); 13 . . . molten processed region; 14 . . . minute void; 15 . . . functional device; 17 . . . rear face (laser light incident face); 21 . . . expansion film (holding member); 23 . . . die bonding resin layer; 28 . . . fracture; L . . . laser light; P . . . light-converging point.

BEST MODES FOR CARRYING OUT THE INVENTION

In the following, a preferred embodiment of the semiconductor substrate cutting method in accordance with the present invention will be explained in detail with reference to the drawings. This embodiment utilizes a phenomenon of multiphoton absorption for forming a modified region within a semiconductor substrate. Therefore, a laser processing method for forming a modified region due to multiphoton absorption will be explained at first.

A material becomes optically transparent if its absorption bandgap $E_G$ is greater than a photon energy hv. Hence, the condition under which absorption occurs in the material is $hv > E_G$. However, even when optically transparent, the material yields absorption under the condition of $nhv > E_G$ ($n=2, 3, 4, \ldots$) if the intensity of laser light is very high. This phenomenon is known as multiphoton absorption. In the case of pulse waves, the intensity of laser light is determined by the peak power density ($W/cm^2$) of laser light at a light-converging point thereof. The multiphoton absorption occurs, for example, at a peak power density ($W/cm^2$) of $1 \times 10^8$ ($W/cm^2$) or higher. The peak power density is determined by (energy per pulse of laser light at the light-converging point)/(laser light beam spot cross-sectional area×pulse width). In the case of a continuous wave, the intensity of laser light is determined by the electric field strength ($W/cm^2$) of laser light at the light-converging point.

Figure 1:
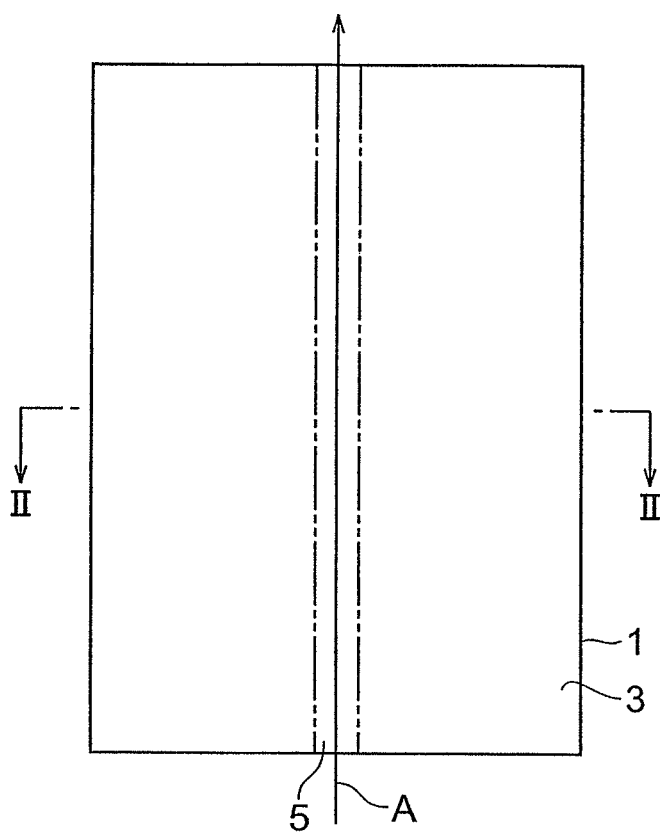
FIG. 1 is a plan view of a semiconductor substrate during laser processing by the laser processing method in accordance with an embodiment of the present invention.
Figure 2:
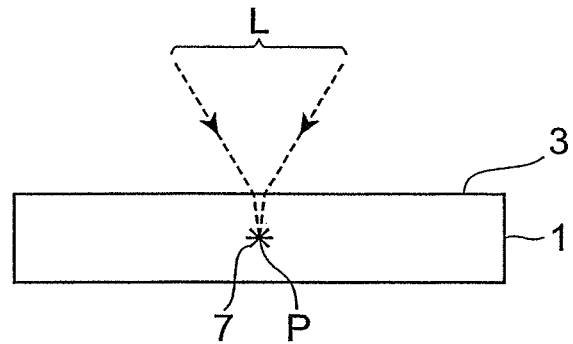
FIG. 2 is a sectional view of the semiconductor substrate taken along the line II-II of FIG. 1.

The laser processing method in accordance with an embodiment of the present invention utilizing such multiphoton absorption will be explained with reference to FIGS. 1 to 6. As shown in FIG. 1, a semiconductor substrate 1 has a front face 3 provided with a line along which the substrate should be cut 5 for cutting the semiconductor substrate 1. The line along which the substrate should be cut 5 is a virtual line extending straight. In the laser processing method in accordance with this embodiment, the semiconductor substrate 1 is irradiated with laser light L while a light-converging point P is positioned within the semiconductor substrate 1 under a condition where multiphoton absorption occurs. The light-converging point P is a location where the laser light L converges. The line along which the substrate should be cut 5 may be either straight or curved, and is not limited to the virtual line, but may be a line actually drawn on the semiconductor substrate 1.

Figure 3:
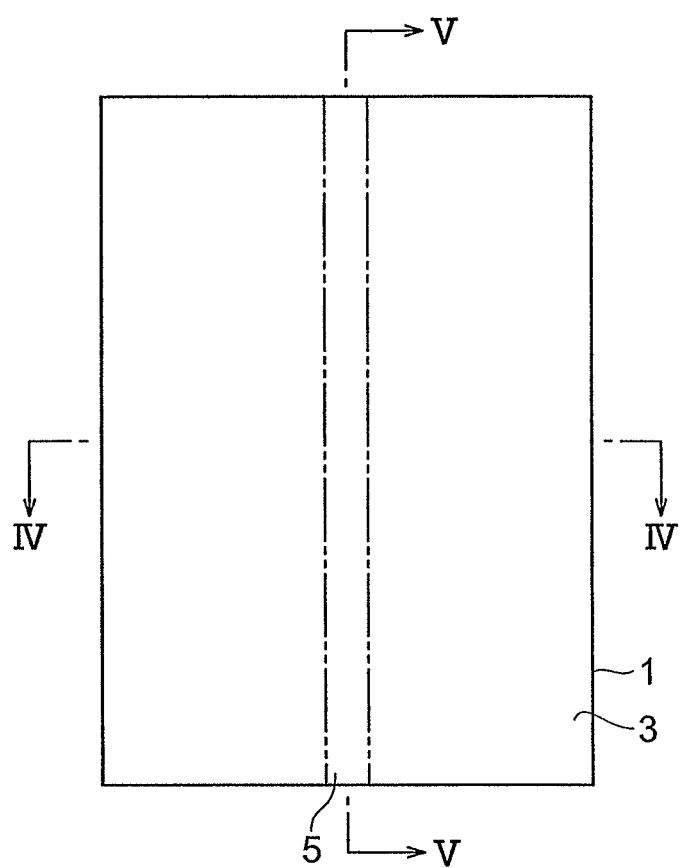
FIG. 3 is a plan view of the semiconductor substrate after laser processing by the laser processing method in accordance with the embodiment.
Figure 4:
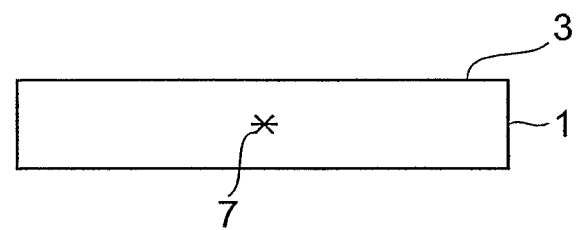
FIG. 4 is a sectional view of the semiconductor substrate taken along the line IV-IV of FIG. 3.
Figure 5:
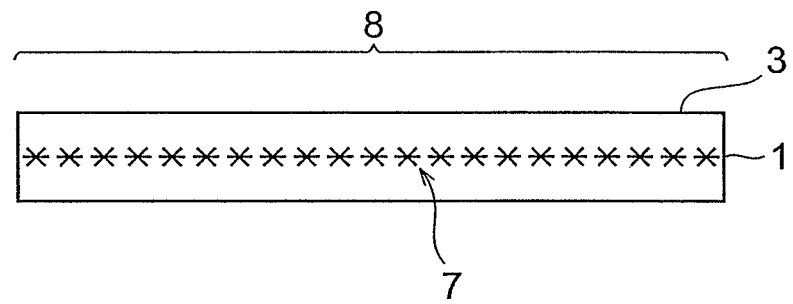
FIG. 5 is a sectional view of the semiconductor substrate taken along the line V-V of FIG. 3.

Then, the laser light L is relatively moved along the line along which the substrate should be cut 5 (i.e., in the direction of arrow A in FIG. 1), so as to move the light-converging point P along the line along which the substrate should be cut 5. This forms a modified region 7 within the semiconductor substrate 1 along the line along which the substrate should be cut 5 as shown in FIGS. 3 to 5, and this modified region 7 becomes a starting point region for cutting 8. The laser processing method of this embodiment forms no modified region 7 by causing the semiconductor substrate 1 to absorb the laser light L upon heating the semiconductor substrate 1. Instead, the laser light L is transmitted through the semiconductor substrate 1, so as to generate multiphoton absorption within the semiconductor substrate 1, thereby forming the modified region 7. Hence, the front face 3 of the semiconductor substrate 1 hardly absorbs the laser light L, and thus does not melt.

Figure 6:
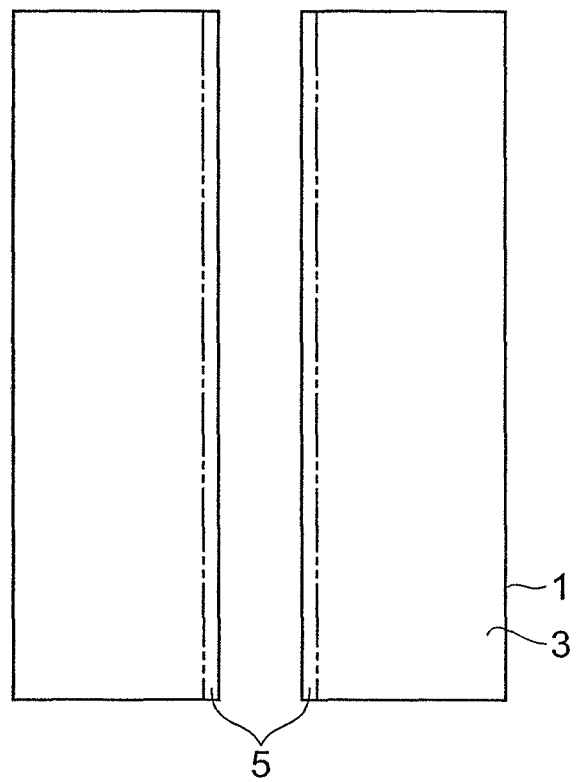
FIG. 6 is a plan view of the semiconductor substrate cut by the laser processing method in accordance with the embodiment.

When the starting point region for cutting 8 is formed within the semiconductor substrate 1, a fracture is likely to occur from the starting point region for cutting 8 acting as a start point, whereby the semiconductor substrate 1 can be cut as shown in FIG. 6 with a relatively small force. Therefore, the semiconductor substrate 1 can be cut with a high accuracy without generating unnecessary fractures in the front face 3 of the semiconductor substrate 1.

There seem to be the following two cases in the cutting of the semiconductor substrate 1 from the starting point region for cutting 8 acting as a start point. The first case is where, after forming the starting point region for cutting 8, an artificial force is applied to the semiconductor substrate 1, so that the semiconductor substrate 1 fractures from the starting point region for cutting 8 acting as a start point, whereby the semiconductor substrate 1 is cut. This is the cutting in the case where the semiconductor substrate 1 has a large thickness, for example. The application of an artificial force encompasses application of bending stress and shearing stress along the starting point region for cutting 8 of the semiconductor substrate 1, and exertion of a temperature difference upon the semiconductor substrate 1 to generate thermal stress, for example. The other case is where the starting point region for cutting 8 is formed, so that the semiconductor substrate 1 is naturally fractured in a cross-sectional direction (thickness direction) of the semiconductor substrate 1 from the starting point region for cutting 8 acting as a start point, whereby the semiconductor substrate 1 is cut. This is enabled, for example, by forming the starting point region for cutting 8 by a single row of modified regions 7 when the semiconductor substrate 1 has a small thickness, and by a plurality of rows of modified regions 7 aligned in the thickness direction when the semiconductor substrate 1 has a large thickness. Even in the case of natural fracturing, fractures do not extend to the front face 3 at a location not formed with the starting point region for cutting 8 in the part to cut, whereby only the part corresponding to the location formed with the starting point region for cutting 8 can be fractured. Thus, fracturing can be regulated well. Such a fracturing method with favorable controllability is quite effective, since the semiconductor substrate 1 such as a silicon wafer has recently been apt to become thinner.

The modified region formed by multiphoton absorption in this embodiment includes the following cases (1) and (2):

(1) Case where the Modified Region is a Molten Processed Region

A semiconductor material is irradiated with laser light while a light-converging point is positioned therewithin under a condition with an electric field intensity of at least $1 \times 10^8$ (W/cm$^2$) at the light-converging point and a pulse width of 1 µs or less. As a consequence, the inside of the semiconductor substrate is locally heated by multiphoton absorption. This heating forms a molten processed region within the semiconductor substrate. The molten processed region refers to a region once melted and then re-solidified, a region just in a melted state, or a region in the process of re-solidifying from its melted state, and may also be defined as a phase-changed region or a region having changed its crystal structure. The molten processed region may also be regarded as a region in which a certain structure has changed into another structure in monocrystal, amorphous, and polycrystal structures. Namely, it refers to a region in which a monocrystal structure has changed into an amorphous structure, a region in which a monocrystal structure has changed into a polycrystal structure, and a region in which a monocrystal structure has changed into a structure including an amorphous structure and a polycrystal structure, for example. When the semiconductor substrate has a silicon monocrystal structure, the molten processed region is an amorphous silicon structure, for example. The upper limit of electric field intensity is $1 \times 10^{12}$ (W/cm$^2$), for example. The pulse width is preferably 1 ns to 200 ns, for example.

By an experiment, the inventors have verified that a molten processed region is formed within a silicon wafer which is an example of semiconductor substrate. Conditions for the experiment are as follows:

(A) Semiconductor Substrate: silicon wafer (having a thickness of 350 µm and an outer diameter of 4 inches)

(B) Laser

Light source: semiconductor laser pumping Nd:YAG laser

Wavelength: 1064 nm

Laser light spot cross-sectional area: $3.14 \times 10^{-8}$ cm$^2$

Oscillation mode: Q-switch pulse

Repetition frequency: 100 kHz

Pulse width: 30 ns

Output: 20 µJ/pulse

Laser light quality: TEM$_{00}$

Polarization characteristic: linear polarization (C) Light-converging lens

Magnification: ×50

N. A.: 0.55

Transmittance with respect to laser light wavelength: 60%

Figure 7:
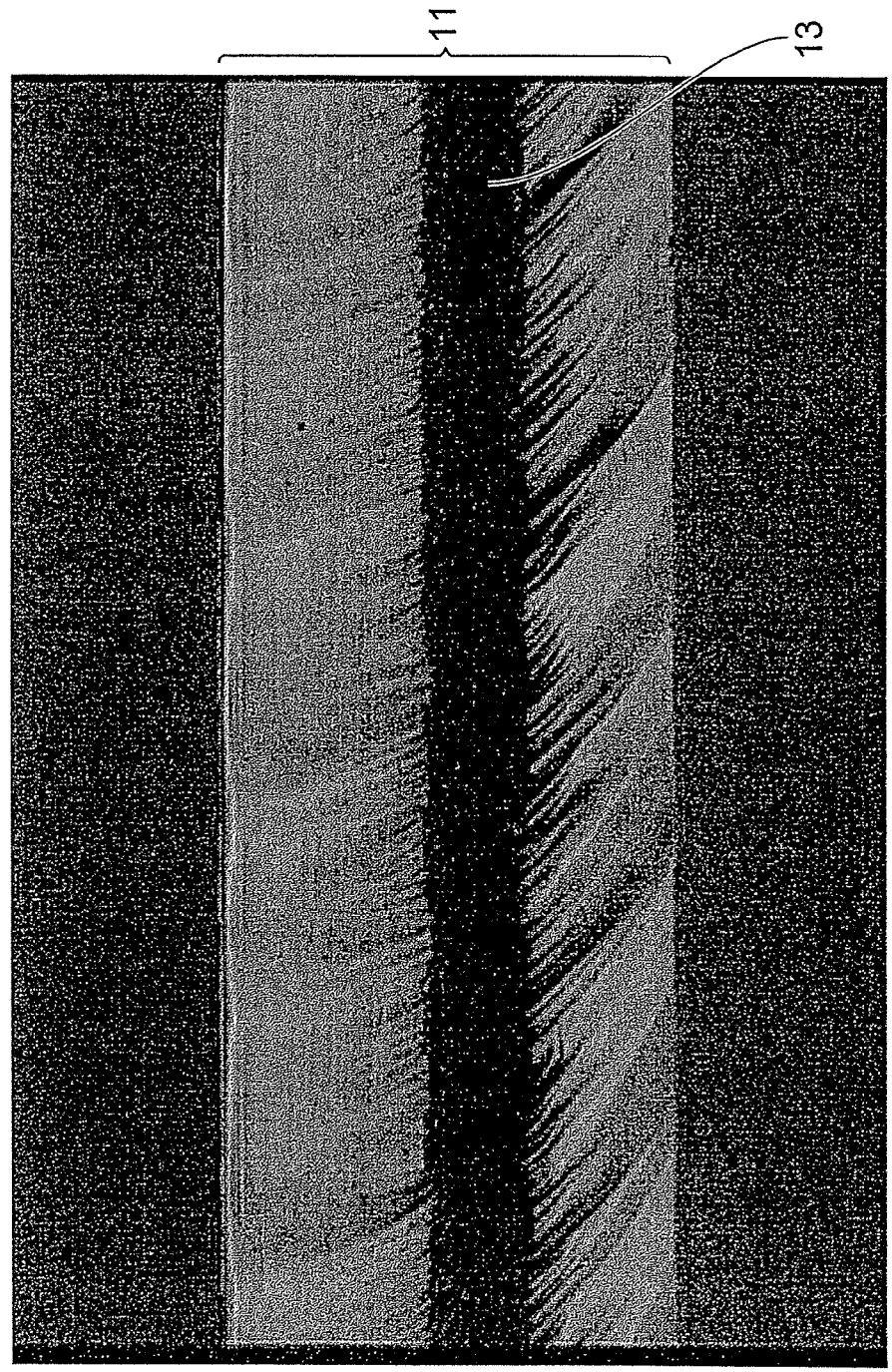
FIG. 7 is a view showing a photograph of a cut section of a silicon wafer formed with a molten processed region by the laser processing method in accordance with the embodiment.

(D) Moving speed of a mounting table mounting the semiconductor substrate: 100 mm/sec FIG. 7 is a view showing a photograph of a cut section in a part of a silicon wafer cut by laser processing under the above-mentioned conditions. A molten processed region 13 is formed within a silicon wafer 11. The size of the molten processed region 13 formed under the above-mentioned conditions is about 100 µm in the thickness direction.

Figure 8:
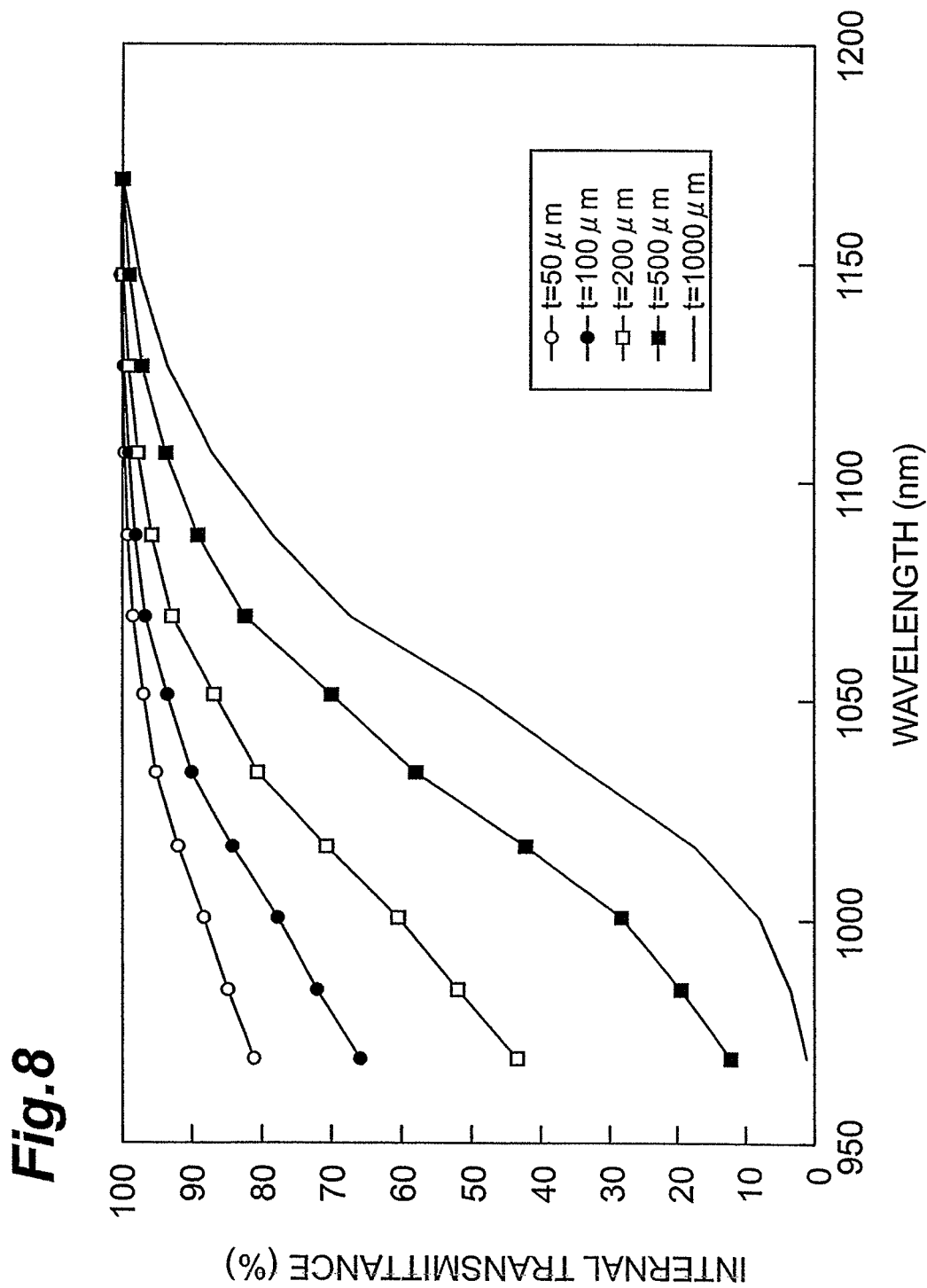
FIG. 8 is a graph showing relationships between the laser light wavelength and the internal transmittance of a silicon substrate in the laser processing method in accordance with the embodiment.

The fact that the molten processed region 13 is formed by multiphoton absorption will now be explained. FIG. 8 is a graph showing relationships between the wavelength of laser light and the transmittance within the silicon substrate. Here, respective reflecting components on the front face side and rear face side of the silicon substrate are eliminated, whereby only the transmittance therewithin is represented. The above-mentioned relationships are shown in the cases where the thickness t of the silicon substrate is 50 µm, 100 µm, 200 µm, 500 µm, and 1000 µm, respectively.

For example, it is seen that, laser light is transmitted through the silicon substrate by at least 80% at 1064 nm, where the wavelength of Nd:YAG laser is located, when the silicon substrate has a thickness of 500 µm or less. Since the silicon wafer 11 shown in FIG. 7 has a thickness of 350 µm, the molten processed region 13 due to multiphoton absorption is formed near the center of the silicon wafer, i.e., at a part separated from the front face by 175 µm. The transmittance in this case is 90% or greater with reference to a silicon wafer having a thickness of 200 µm, whereby the laser light is absorbed within the silicon wafer 11 only slightly and is substantially transmitted therethrough. This means that the molten processed region 13 is not formed by laser light absorption within the silicon wafer 11 (i.e., not formed upon usual heating with laser light), but by multiphoton absorption. The forming of a molten processed region by multiphoton absorption is described, for example, in "Processing Characteristic Evaluation of Silicon by Picosecond Pulse Laser", *Preprints of the National Meeting of Japan Welding Society*, No. 66 (April 2000), pp. 72-73.

Here, a fracture is generated in the cross-sectional direction while using a molten processed region as a start point, whereby the silicon wafer is cut when the fracture reaches the front face and rear face of the silicon wafer. The fracture reaching the front face and rear face of the silicon wafer may grow naturally or grow as a force is applied to the silicon wafer. The fracture may naturally grow from the starting point region for cutting to the front face and rear face of the silicon wafer in any of the cases where the fracture grows from the molten processed region in a melted state and where the fracture grows from the molten processed region in the process of re-solidifying from the melted state. In any of these cases, the molten processed region is formed only within the silicon wafer. In the cut section after cutting, the molten processed region is formed only therewithin as shown in FIG. 7. When a molten processed region is formed within the semiconductor substrate as such, unnecessary fractures deviating from a line along which the substrate should be cut are hard to occur at the time of fracturing, which makes it easier to control the fracturing.

Figure 9:
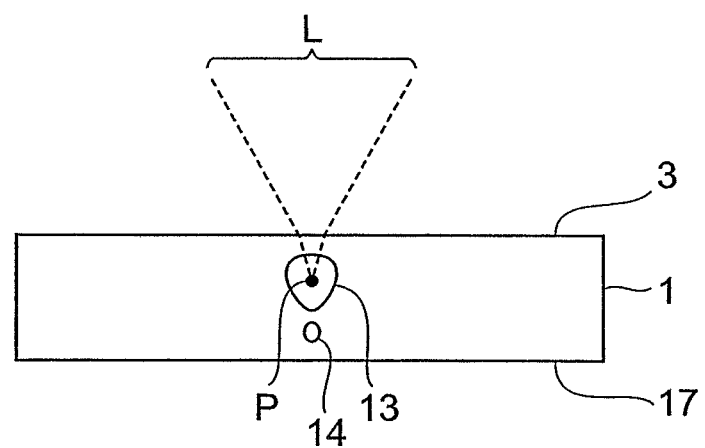
FIG. 9 is a sectional view of the semiconductor substrate formed with a molten processed region and a minute void by the laser processing method in accordance with the embodiment.

(2) Case where the Modified Region is Constituted by a Molten Processed Region and a Minute Void A semiconductor substrate is irradiated with laser light while a light-converging point is positioned therewithin under a condition with an electric field intensity of at least $1 \times 10^8$ (W/cm$^2$) at the light-converging point and a pulse width of 1 µs or less. This may form a molten processed region and a minute void within the semiconductor substrate. When the laser light L is incident on the semiconductor substrate 1 from the front face 3 side as shown in FIG. 9, a minute void 14 is formed on the rear face 17 side of the molten processed region 13. Though the molten processed region 13 and the minute void 14 are formed so as to be separated from each other in FIG. 9, there is a case where the molten processed region 13 and the minute void 14 are formed continuously with each other. Namely, when the molten processed region and minute void are formed as a pair by multiphoton absorption, the minute void is formed on the opposite side of the molten processed region from the laser light incident face in the semiconductor substrate. The upper limit for the electric field intensity is $1 \times 10^{12}$ (W/cm$^2$), for example. The pulse width is preferably 1 ns to 200 ns, for example.

A principle by which minute voids 14 are formed so as to correspond to respective molten processed regions 13 when the laser light L is transmitted through the semiconductor substrate 1, so as to generate multiphoton absorption, thereby forming the molten processed regions 13 is not totally clear. Here, two hypotheses presumed by the inventors concerning the principle by which the molten processed regions 13 and minute voids 14 are formed in pairs will be explained.

Figure 10:
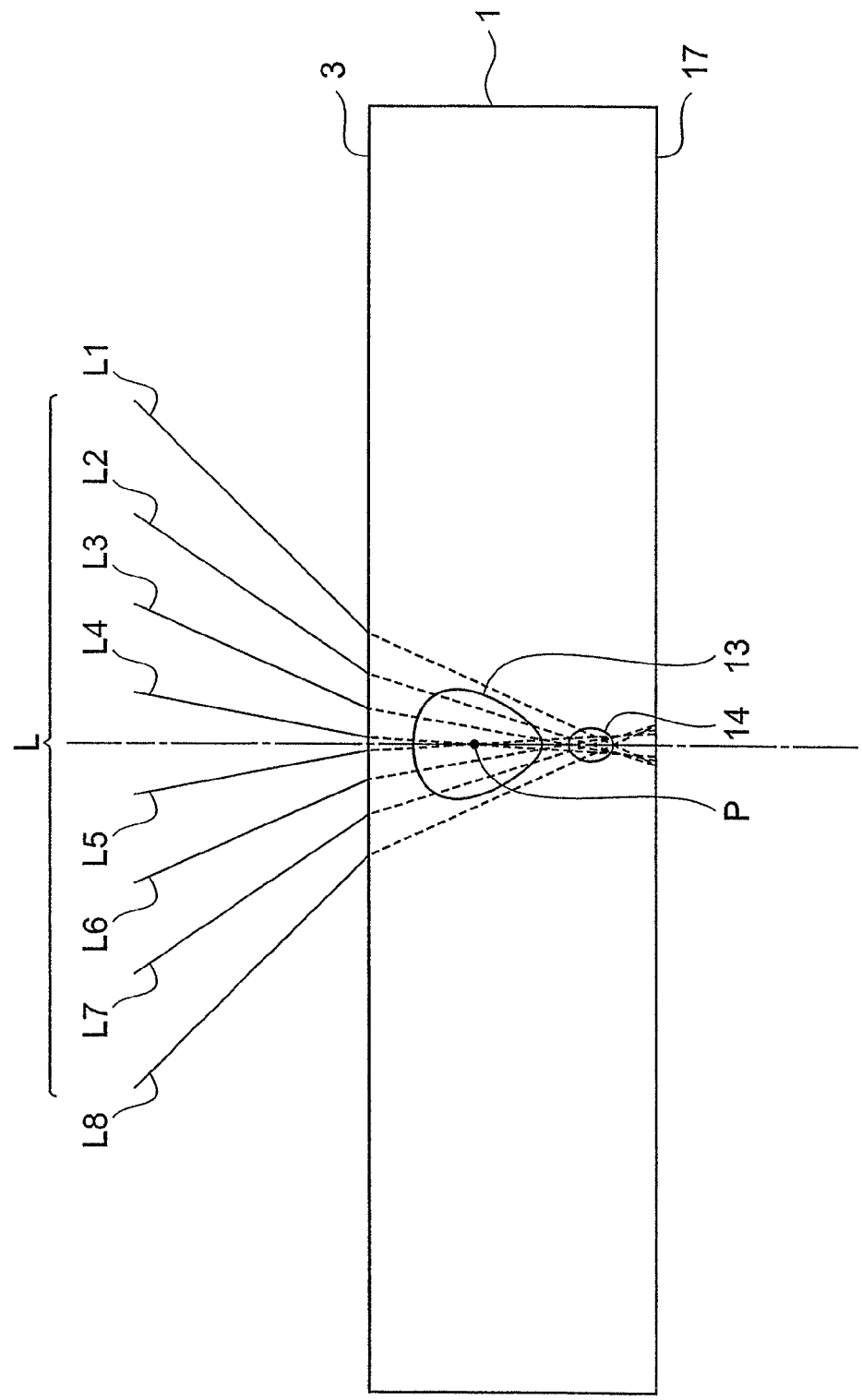
FIG. 10 is a sectional view for explaining a principle by which the molten processed region and minute void are formed by the laser processing method in accordance with the embodiment.

The following is the first hypothesis presumed by the inventors. When the semiconductor substrate 1 is irradiated with laser light L while its focal point is positioned at a light-converging point P within the semiconductor substrate 1 as shown in FIG. 10, a molten processed region 13 is formed near the light-converging point P. Conventionally, light components (L4 and L5 in FIG. 10) in the center part of the laser light L emitted from a laser light source have been used as the laser light L. This aims at employing the center part of the Gaussian distribution of laser light L. In order to restrain the laser light L from affecting the front face 3 of the semiconductor substrate 1, the inventors have decided to widen the laser light L. As a technique therefor, the laser light L emitted from the laser light source is expanded by a predetermined optical system, so as to widen skirts of the Gaussian distribution, thereby relatively increasing the laser intensity of light components (L1 to L3 and L6 to L8 in FIG. 10) in marginal parts of the laser light. When thus expanded laser light L is transmitted through the semiconductor substrate 1, a molten processed region 13 is formed near the light-converging point P as explained above, and a minute void 14 is formed at a part corresponding to the molten processed region 13. Namely, the molten processed region 13 and minute void 14 are formed at respective positions along the optical axis (the dash-single-dot line in FIG. 10) of the laser light. The position where the minute void 14 is formed corresponds to a part where the light components (L1 to L3 and L6 to L8 in FIG. 10) in marginal parts of the laser light L are theoretically converged. It seems to be because of the spherical aberration of a lens converging the laser light L that light components (L4 and L5 in FIG. 10) in the center part of the laser light are converged at a position different from positions where the light components (L1 to L3 and L6 to L8 in FIG. 10) in marginal parts of the laser light L are converged as such in terms of the thickness direction of the semiconductor substrate 1. The first hypothesis presumed by the inventors lies in that this difference in light-converging positions exerts some influences.

The following is the second hypothesis presumed by the inventors. The part where the light components (L1 to L3 and L6 to L8 in FIG. 10) in marginal parts of the laser light L converge is a theoretical laser light-converging point, and thus has such a high optical intensity that a minute structural change occurs, thereby forming the minute void 14 whose surroundings do not change in terms of the crystal structure, whereas the part formed with the molten processed region 13 is thermally affected so much as to be simply melted and then re-solidified.

Here, the molten processed region is as stated in (1) mentioned above, whereas the minute void is one whose surroundings do not change in terms of the crystal structure. When the semiconductor substrate has a silicon monocrystal structure, the surroundings of the minute void are likely to keep the silicon monocrystal structure.

By an experiment, the inventors have verified that molten processed regions and minute voids are formed within a silicon wafer which is an example of the semiconductor substrate. Conditions for the experiment are as follows:

(A) Object to be processed: silicon wafer (having a thickness of 100 μm)

(B) Laser
Light source: semiconductor laser pumping Nd:YAG laser
Wavelength: 1064 nm
Repetition frequency: 40 kHz
Pulse width: 30 nsec
Pulse pitch: 7 μm
Processing depth: 8 μm
Pulse energy: 50 μJ/pulse (C) Light-converging lens
N. A.: 0.55

(D) Moving speed of a mounting table mounting the object: 280 mm/sec

FIG. 11 is a view showing photographs of a cut section of a silicon wafer cut by laser processing under the above-mentioned conditions. In FIG. 11, (a) and (b) are photographs showing the same cut section in respective scales different from each other. As depicted, pairs of molten processed regions 13 and minute voids 14, each pair being formed upon irradiation with one pulse of laser light L, are made with a predetermined pitch along the cut section (i.e., along a line along which the substrate should be cut). Each of the molten processed regions 13 of the cut section shown in FIG. 11 has a width of about 13 μm in the thickness direction of the silicon wafer 11 (the vertical direction in the drawing) and a width of about 3 μm in the direction of moving the laser light L (the horizontal direction in the drawing). Each of the minute voids 14 has a width of about 7 μm in the thickness direction of the silicon wafer 11 and a width of about 1.3 μm in the direction of moving the laser light L. The gap between each molten processed region 13 and its corresponding minute void 14 is about 1.2 μm.

The cases of (1) and (2) are explained in the foregoing as a modified region formed by multiphoton absorption. When a starting point region for cutting is formed as follows in view of the crystal structure of the semiconductor substrate, its cleavage property, and the like, the semiconductor substrate can be cut accurately with a smaller force from the starting point region for cutting acting as a start point.

Namely, in the case of a substrate made of a monocrystal semiconductor having a diamond structure such as silicon, the starting point region for cutting is preferably formed in a direction along the (111) plane (first cleavage plane) or (110) plane (second cleavage plane). In the case of a substrate made of a III-V family compound semiconductor having a zinc ore type structure such as GaAs, the starting point region for cutting is preferably formed in a direction along the (110) plane.

When the substrate is formed with an orientation flat along a direction to be formed with the starting point region for cutting (e.g., in a direction along the (111) plane in the monocrystal silicon substrate) or a direction orthogonal to the direction to be formed with the starting point region for cutting, the starting point region for cutting extending along the direction to be formed with the starting point region for cutting can be formed in the substrate in an easy and accurate manner with reference to the orientation flat.

A preferred embodiment of the semiconductor substrate cutting method in accordance with the present invention will now be explained more specifically. FIGS. 13 to 16 are partial sectional views of the silicon wafer taken along the line XIII-XIII of FIG. 12.

Figure 12:
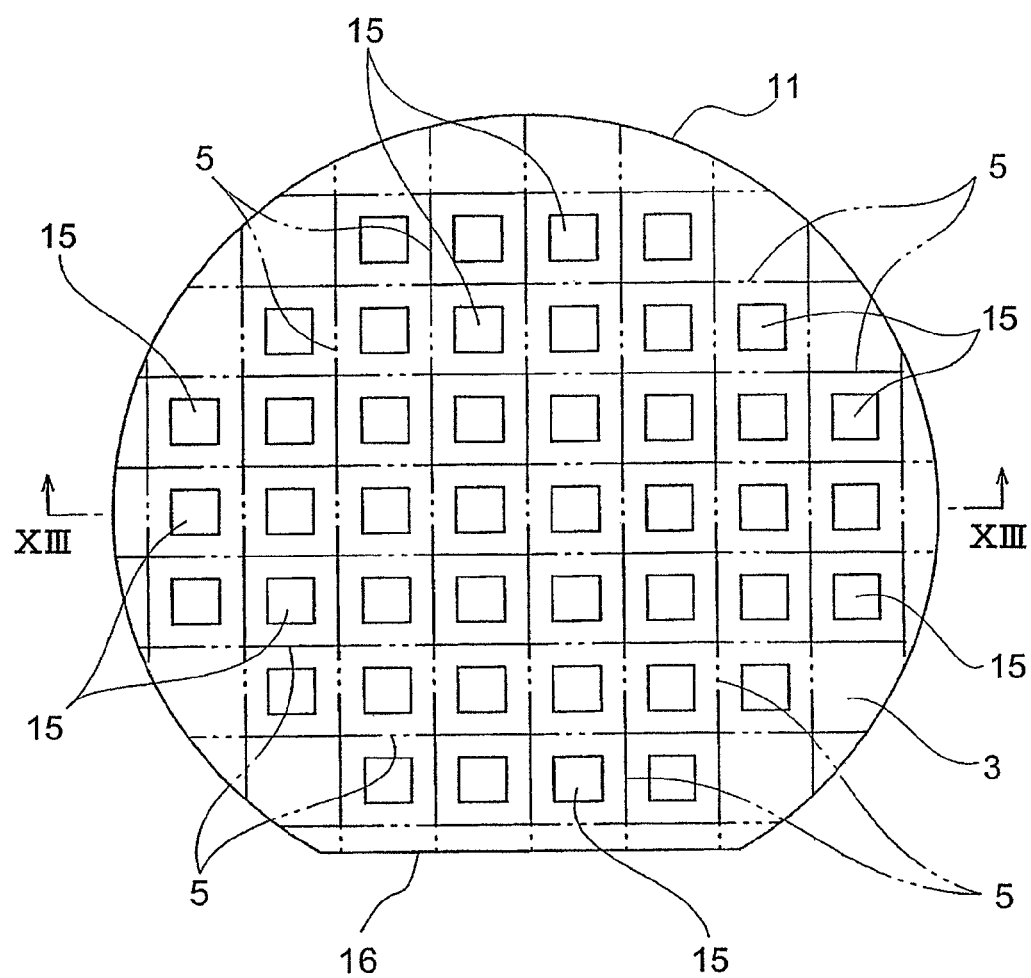
FIG. 12 is a plan view of a silicon wafer to become an object to be processed in the semiconductor substrate cutting method in accordance with the embodiment.
Figure 13:
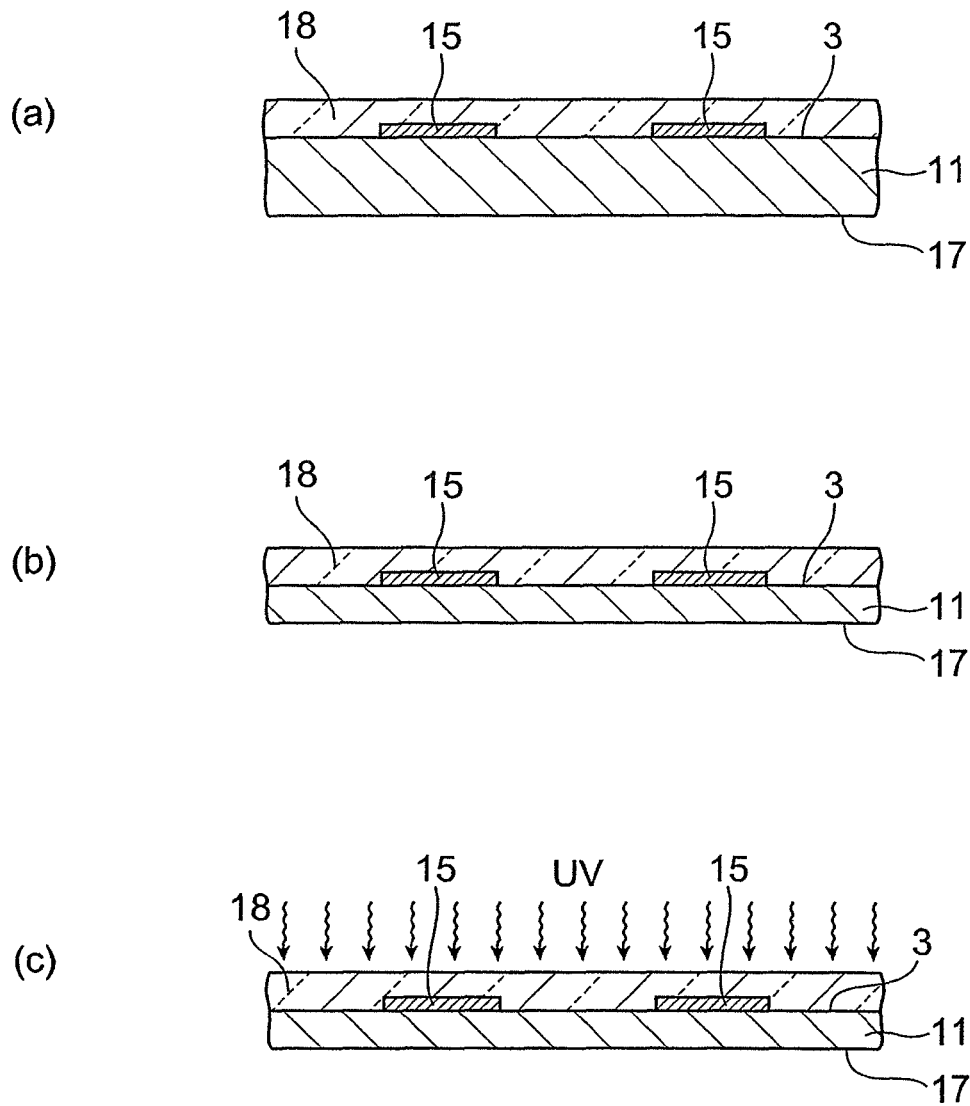
FIG. 13 is a schematic view for explaining the semiconductor substrate cutting method in accordance with the embodiment, in which (a), (b), and (c) illustrate respective states where a protective film is attached to the silicon wafer, the silicon wafer is thinned, and the protective film is irradiated with UV rays.
Figure 14:
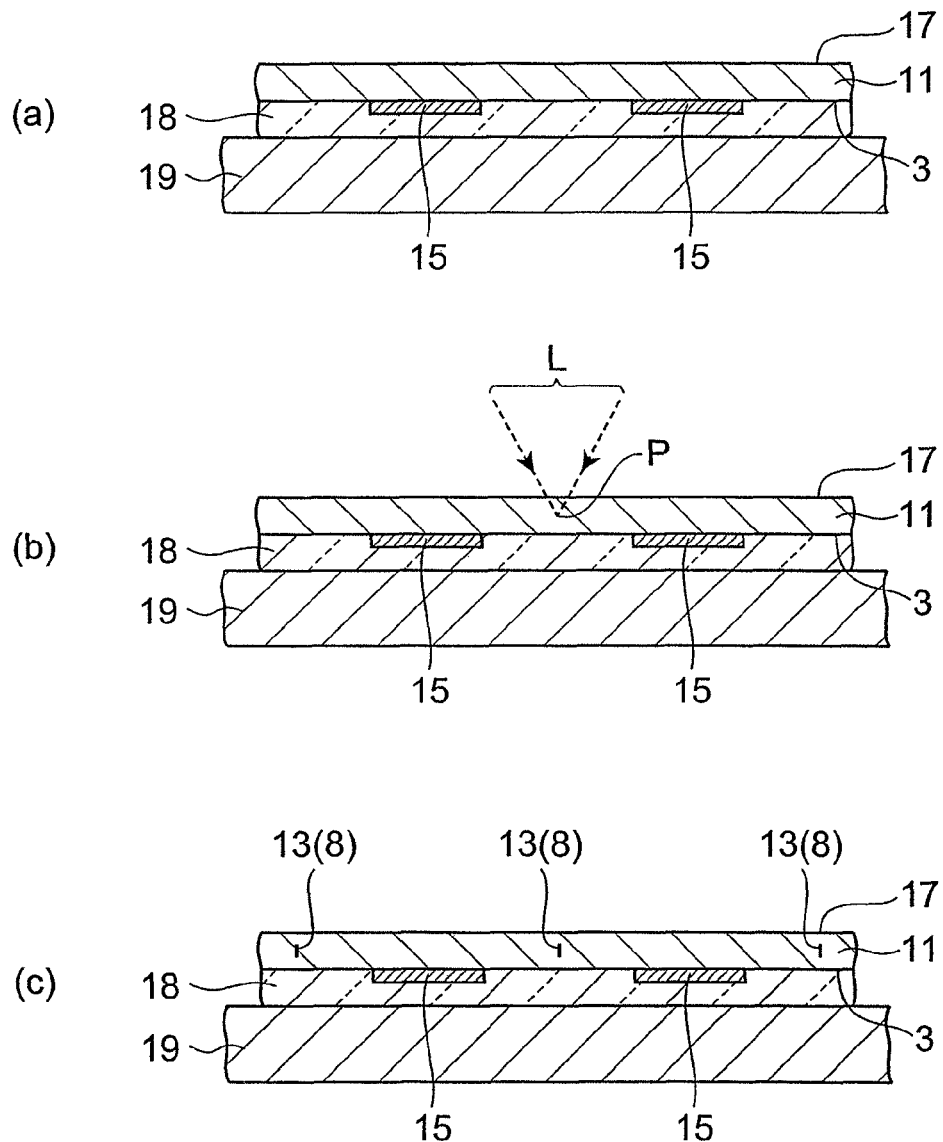
FIG. 14 is a schematic view for explaining the semiconductor substrate cutting method in accordance with the embodiment, in which (a), (b), and (c) illustrate respective states where the silicon wafer and protective film are secured onto a mounting table, the silicon wafer is irradiated with laser light, and a starting point region for cutting is formed within the silicon wafer.
Figure 15:
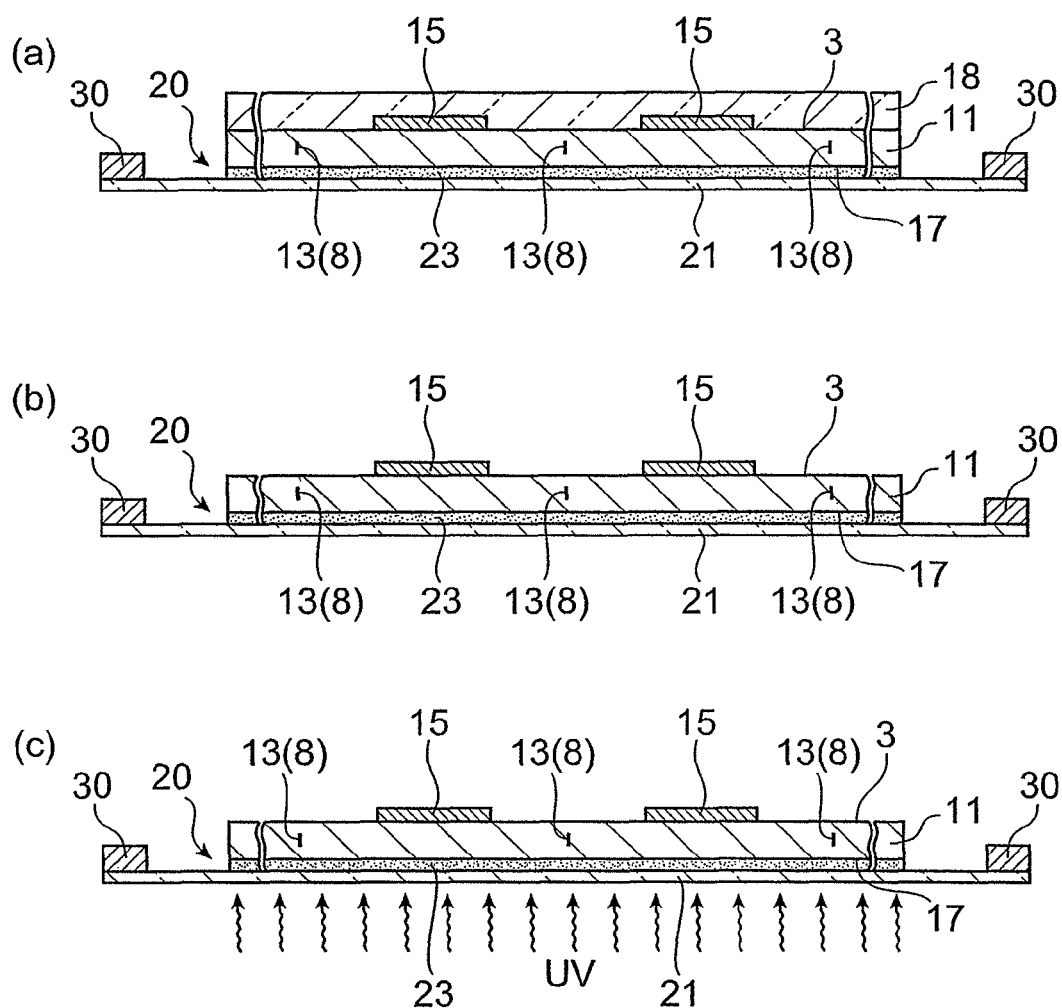
FIG. 15 is a schematic view for explaining the semiconductor substrate cutting method in accordance with the embodiment, in which (a), (b), and (c) illustrate respective states where a die bonding resin bearing film is attached to the silicon wafer, the protective film is peeled off from the silicon wafer, and the expansion film is irradiated with UV rays.
Figure 16:
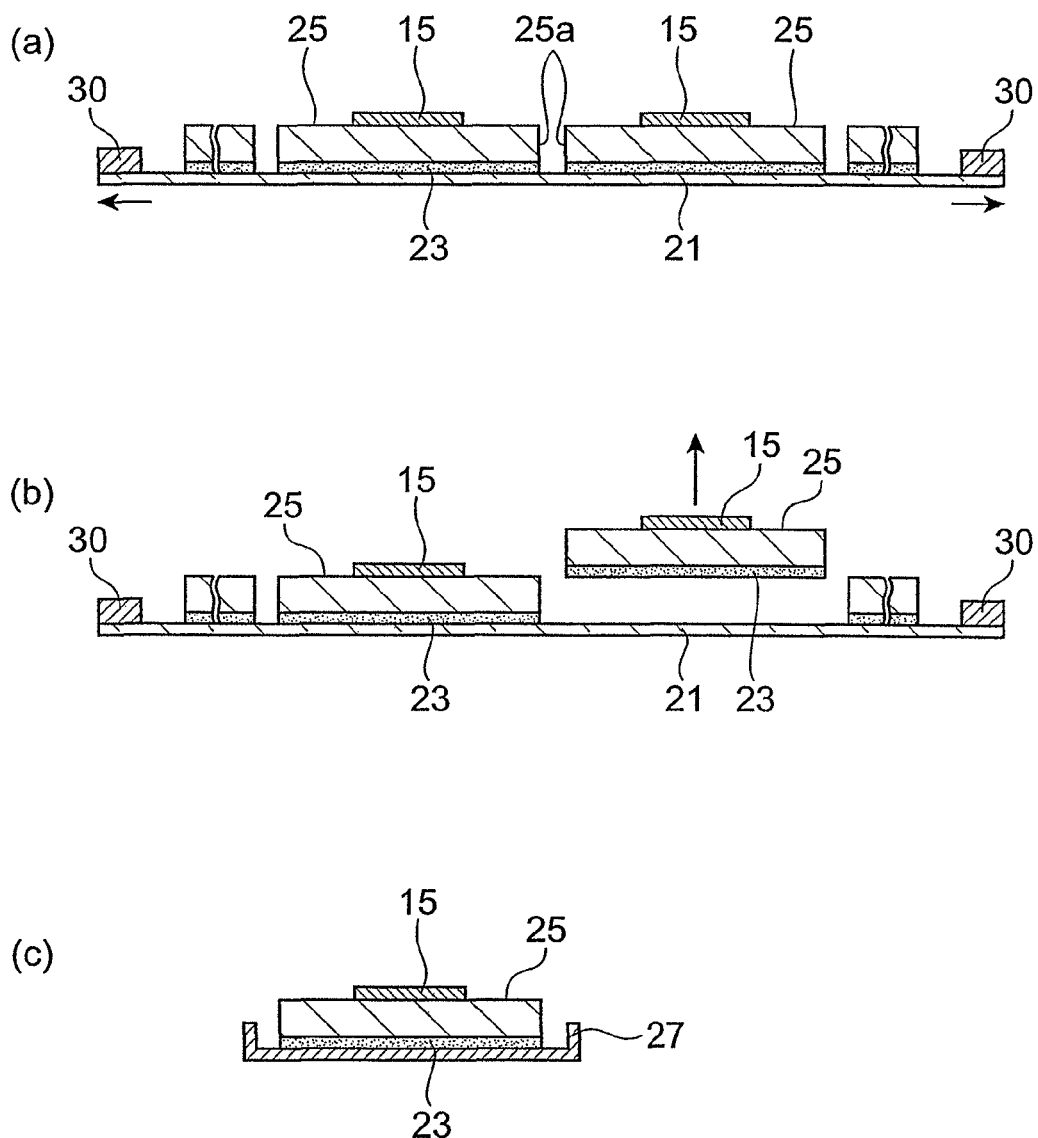
FIG. 16 is a schematic view for explaining the semiconductor substrate cutting method in accordance with the embodiment, in which (a), (b), and (c) illustrate respective states where the expansion film is expanded, semiconductor chips are picked up together with cut pieces of a die bonding resin layer, and the semiconductor chip is joined to a lead frame by way of the die bonding resin layer.

As shown in FIG. 12, on the front face 3 of the silicon wafer (semiconductor substrate) 11 to become an object to be processed, a plurality of functional devices 15 are formed into a matrix pattern in directions parallel and perpendicular to the orientation flat 16. In the following manner, such a silicon wafer 11 is cut into the individual functional devices 15.

First, as shown in FIG. 13(a), a protective film 18 is attached to the front face 3 side of the silicon wafer 11, so as to cover the functional devices 15. The protective film 18 protects the functional devices 15 and hold the silicon wafer 11. After attaching the protective film 18, as shown in FIG. 13(b), the rear face 17 of the silicon wafer 11 is subjected to surface grinding such that the silicon wafer 11 attains a predetermined thickness, and then is subjected to chemical etching so as to be smoothed. Thus, for example, the silicon wafer 11 having a thickness of 350 μm is thinned to a thickness of 100 μm. After the silicon wafer 11 is thinned, the protective film 18 is irradiated with UV rays. This hardens a UV-curable resin layer which is an adhesive layer of the protective film 18, thereby making the protective film 18 easier to peel off from the silicon wafer 11.

Subsequently, using a laser processing apparatus, a starting point region for cutting is formed within the silicon wafer 11. Namely, as shown in FIG. 14(a), the protective film 18 is secured by vacuum suction onto a mounting table 19 of the laser processing apparatus such that the rear face 17 of the silicon wafer 11 faces up, and a line along which the substrate should be cut 5 is set like a grid (see dash-double-dot lines in FIG. 12) running between neighboring functional devices 15, 15. Then, as shown in FIG. 14(b), the silicon wafer 11 is irradiated with laser light L under the above-mentioned condition generating multiphoton absorption while positioning a light-converging point P within the silicon wafer 11 with the rear face 17 acting as a laser light incident face, and the mounting table 19 is moved such that the light-converging point P is relatively moved along the line along which the substrate should be cut 5. Consequently, as shown in FIG. 14(c), molten processed regions 13 form starting point regions for cutting 8 within the silicon wafer 11 along the line along which the substrate should be cut 5.

Subsequently, the silicon wafer 11 having the protective film 18 attached thereto is removed from the mounting table 19, and a die bonding resin bearing film 20 (e.g., LE-5000 (product name) by Lintec Corporation) is attached to the rear face 17 of the silicon wafer 11 as shown in FIG. 15(a). The die bonding resin bearing film 20 comprises an expandable expansion film (holding member) 21 having a thickness of about 100 μm. On the expansion film 21, a die bonding resin layer (an adhesive resin layer) 23 functioning as a die bonding adhesive is disposed by way of a UV-curable resin layer having a thickness of several μm. Namely, the expansion film 21 is attached to the rear face 17 of the silicon wafer 11 by way of the die bonding resin layer 23. Film expanding means 30 are attached to marginal parts of the expansion film 21. After attaching the die bonding resin bearing film 20, the protective film 18 is peeled off from the front face 3 side of the silicon wafer 11 as shown in FIG. 15(b), and the expansion film 21 is irradiated with UV rays as shown in FIG. 15(c). This hardens a UV-curable resin layer which is an adhesive layer of the expansion film 21, thereby making the die bonding resin layer 23 easier to peel off from the expansion film 21.

Subsequently, as shown in FIG. 16(a), the film expanding means 21 pull the marginal parts of the expansion film 21 outward, thereby expanding the expansion film 21. Expanding the expansion film 21 generates fractures from the starting point regions for cutting 8 acting as start points, and these fractures reach the front face 3 and rear face 17 of the silicon wafer 11. As a consequence, the silicon wafer 11 is cut accurately along the line along which the substrate should be cut 5, whereby a plurality of semiconductor chips 25 each having one functional device 15 are obtained. Here, as the expansion film 21 expands, opposing cut surfaces 25a, 25a of neighboring semiconductor chips 25, 25 are released from their close contact state. Therefore, simultaneously with the cutting of the silicon wafer 11, the die bonding resin layer 23 closely in contact with the rear face 17 of the silicon wafer 11 is cut along the line along which the substrate should be cut 5.

Then, as shown in FIG. 16(b), the semiconductor chips 25 are successively picked up by a suction collect or the like. Here, the die bonding resin layer 23 is cut into an outer shape equivalent to that of the semiconductor chip 25, whereas the adhesion force between the die bonding resin layer 23 and the expansion film 21 is lowered, whereby the semiconductor chip 25 is picked up while in a state where the cut piece of the die bonding resin layer 23 is in close contact with the rear face thereof. Then, as shown in FIG. 16(c), the semiconductor chip 25 is mounted by way of the die bonding resin layer 23 in close contact with the rear face thereof onto a die pad of a lead frame 27, and is bonded to the latter with the filler upon heating.

In the method of cutting the silicon wafer 11 in the foregoing, the silicon wafer 11 having the front face 3 formed with the functional devices 15 is employed as an object to be processed, and the silicon wafer 11 is irradiated with the laser light L while positioning the light-converging point P within the silicon wafer 11 with the rear face 17 acting as a laser light incident face. This generates multiphoton absorption within the silicon wafer 11, thereby causing the molten processed region 13 to form the starting point region for cutting 8 within the silicon wafer 11 along the line along which the substrate should be cut 5. Here, the rear face of the semiconductor substrate is employed as the laser light incident face, since there is a fear of the functional device restraining laser light from entering when the front face is used as the laser light incident face. When the starting point region for cutting 8 is formed within the silicon wafer 11 as such, a fracture can be generated from the starting point region for cutting 8 acting as a start point naturally or with a relatively small force applied thereto, so as to reach the front face 3 and rear face 17 of the silicon wafer 11. Therefore, after the starting point region for cutting 8 is formed, the expandable holding member 21 is attached to the rear face 17 of the silicon wafer 11 by way of the die bonding resin layer 23, whereby the cut surfaces 25a, 25a of the semiconductor substrate cut along the line along which the substrate should be cut 5 are released from their close contact state as the expansion film 21 expands. This also cuts the die bonding resin layer 23 existing between the silicon wafer 11 and expansion film 21 along the line along which the substrate should be cut 5. Hence, the silicon wafer 11 and die bonding resin layer 23 can be cut along the line along which the substrate should be cut 5 much more efficiently than in the case cut with a blade.

Also, since the cut surfaces 25a, 25a of the silicon wafer 11 cut along the line along which the substrate should be cut 5 are initially in close contact with each other, the cut individual pieces of the silicon wafer 11 and the cut individual pieces of the die bonding resin layer 23 have substantially the same outer shape, whereby the die bonding resin can be prevented from protruding from the cut surface 25 of each piece of the silicon wafer 11.

Further, before forming the starting point region for cutting 8 within the silicon wafer 11, the rear face 17 of the silicon wafer 11 is ground such that the silicon wafer 11 attains a predetermined thickness. When the silicon wafer 11 is thinned to a predetermined thickness as such, the silicon wafer 11 and die bonding resin 23 can be cut more accurately along the line along which the substrate should be cut 5.

The above-mentioned method of cutting the silicon wafer 11 relates to a case where, as shown in FIG. 17(a), no fracture generated from the starting point region for cutting 8 acting as a start point occurs in the silicon wafer 11 until the expansion film 21 is expanded. However, as shown in FIG. 17(b), a fracture 28 may be generated from the starting point region for cutting 8 acting as a start point and caused to reach the front face 3 and rear face 17 of the silicon wafer 11 before expanding the expansion film 21. Examples of the method of generating the fracture 28 include one in which stress applying means such as a knife edge is pressed against the rear face 17 of the silicon wafer 11 along the starting point region for cutting 8, so as to generate a bending stress or shearing stress in the silicon wafer 11 along the starting point region for cutting 8; and one in which a temperature difference is imparted to the silicon wafer 11, so as to generate a thermal stress in the silicon wafer 11 along the starting point region for cutting 8.

Stressing and cutting the silicon wafer 11 along the starting point region for cutting 8 as such before expanding the expansion film 21 can yield a semiconductor chip 25 which is cut with a very high accuracy. When the expansion film 21 attached to the silicon wafer 11 is expanded, the opposing cut surfaces 25a, 25a of the neighboring semiconductor chips 25, 25 are released from their close contact state in this case as well, whereby the die bonding resin layer 23 closely in contact with the rear face 17 of the silicon wafer 11 is cut along the cut surfaces 25a. Therefore, the silicon wafer 11 and die bonding resin layer 23 can be cut along the starting point region for cutting 8 much more efficiently in this cutting method than in the case of cutting with a blade.

When the silicon wafer 11 is thin, the fracture 28 generated from the starting point region for cutting 8 acting as a start region may reach the front face 3 and rear face 17 of the silicon wafer 11 as shown in FIG. 17(b) even if no stress is generated along the starting point region for cutting 8.

When the starting point region for cutting 8 due to the molten processed region 13 is formed within the silicon wafer 11 near the front face 3, and the fracture 28 is allowed to reach the front face 3 as shown in FIG. 18(a), the cutting accuracy can be made very high in the front face (i.e., the surface formed with the functional device) of the semiconductor chip 25 obtained by cutting. When the starting point region for cutting 8 due to the molten processed region 13 is formed within the silicon wafer 11 near the rear face 17, and the fracture 28 is allowed to reach the rear face 17 as shown in FIG. 18(b), on the other hand, the die bonding resin layer 23 can be cut accurately by expanding the expansion film 21.

The present invention is not limited to the above-mentioned embodiment. For example, though the above-mentioned embodiment relates to a case where the modified region 7 is formed by generating multiphoton absorption within the semiconductor substrate 1, there are cases where the modified region 7 can be formed by generating optical absorption equivalent to multiphoton absorption within the semiconductor substrate 1.

Though the above-mentioned method of cutting the silicon wafer 11 relates to a case where the molten processed region 13 is formed as a modified region, the molten processed region 13 and minute void 14 may be formed as a modified region. In this case, since the rear face 17 of the silicon wafer 11 is employed as the laser light incident face, the minute void 14 is formed on the opposite side of the molten processed region 13 from the laser light incident face, i.e., the front face 3 side formed with the functional device 15. In cut surfaces, the part on the minute void 14 side tends to attain an accuracy higher than that in the part on the molten processed region 13 side, whereby the yield of the semiconductor chips 25 can further be improved when the minute void 14 is formed on the front face 3 side formed with the functional device 15.

If the die bonding resin layer 23 is heated before expanding the expansion film 21 of the die bonding resin bearing film 20, the die bonding resin layer 23 can be cut more accurately and easily along the line along which the substrate should be cut 5 simultaneously with the cutting of the silicon wafer 11 when expanding the expansion film 21. This seems to be because the die bonding resin layer 23 changes its physical property to one easy to tear apart upon heating. Specifically, when the die bonding resin layer 23 is heated for 1 to 30 minutes at a temperature of 50° C. to 120° C., the die bonding resin layer 23 changes its physical property to one easy to tear apart upon heating. In this regard, the die bonding resin layer 23 is less likely to change its physical property when the temperature is lower than 50° C., whereas there is a fear of the die bonding resin layer 23 softening such as to lose its original shape if the temperature exceeds 120° C.

As a method of heating the die bonding resin layer 23 as mentioned above, the die bonding resin layer 23 as a whole may be heated, or a part of the die bonding resin layer 23 along the line along which the substrate should be cut 5 may selectively be heated. For heating the die bonding resin layer 23 as a whole, the silicon wafer 11 and the die bonding resin bearing film 20 attached to the rear face 17 of the silicon wafer 11 may be blown by warm air, put into a heating furnace, or mounted on a heating table in which a heater is embedded. For selectively heating a part of the die bonding resin layer 23 along the line along which the substrate should be cut 5, it will be sufficient if the line along which the substrate should be cut 5 is irradiated with, laser light to which the die bonding resin layer 23 exhibits optical absorption, etc.

The die bonding resin layer 23 may be heated at any time from when the expansion film 21 is attached to the rear face 17 of the silicon wafer 11 by way of the die bonding resin layer 23 until the silicon wafer 11 and die bonding resin layer 23 are cut along the line along which the substrate should be cut 5 by expanding the expansion film 21. Before attaching the expansion film 21 to the rear face 17 of the silicon wafer 11 by way of the die bonding resin layer 23, the die bonding resin layer 23 may be heated while in the state of the die bonding resin bearing film 20, and then the expansion film 21 may be attached to the silicon wafer 11 by way of thus heated die bonding resin layer 23. In this case, the expansion film 21 may be attached to the silicon wafer 11 by way of the heated die bonding resin layer 23 immediately after heating the die bonding resin layer 23, or after a predetermined time from the heating of the die bonding resin layer 23. One of reasons why heating makes the die bonding resin layer 23 easier to divide as such seems to lie in that it reduces fracture elongation and increases tensile strength. Also, there are cases where the die bonding resin layer 23 can change its physical property to one easy to tear apart when irradiated with electromagnetic waves such as UV rays.

Here, specific examples of selectively heating the part of die bonding resin layer 23 along the line along which the substrate should be cut 5 will be explained. Among the drawings, parts identical or equivalent to each other will be referred to with numerals identical to each other without repeating their overlapping descriptions.

Figure 19:
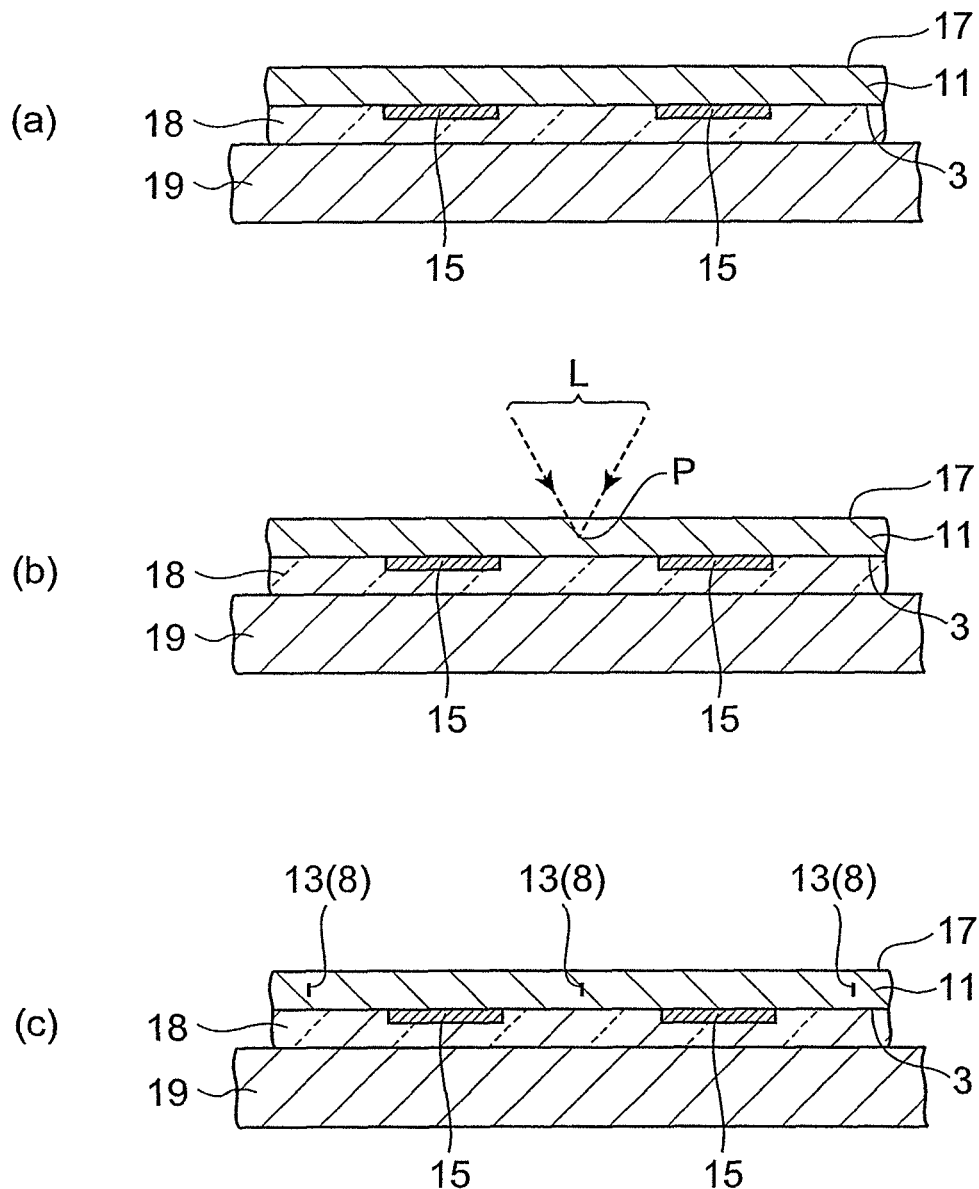
FIG. 19 is a schematic view for explaining a specific example of the semiconductor substrate cutting method in accordance with the embodiment, in which (a), (b), and (c) illustrate respective states where the silicon wafer and protective film are secured onto a mounting table, the silicon wafer is irradiated with laser light, and the starting point region for cutting is formed within the silicon wafer.

First, as shown in FIG. 19(a), a protective film 18 is attached to the front face 3 side of the silicon wafer 11, so as to cover the functional devices 15, and then is secured by vacuum suction onto the mounting table 19 of the laser processing apparatus such that the rear face 17 of the silicon wafer 11 faces up. After a line along which the substrate should be cut 5 is set like a grid running between neighboring functional devices 15, 15, the silicon wafer 11 is irradiated with laser light L under the condition generating multiphoton absorption while positioning a light-converging point P within the silicon wafer 11 with the rear face 17 acting as a laser light incident face as shown in FIG. 19(*b*), and the mounting table 19 is moved such that the light-converging point P is relatively moved along the line along which the substrate should be cut 5. Consequently, as shown in FIG. 19(*c*), molten processed regions 13 form starting point regions for cutting 8 within the silicon wafer 11 along the line along which the substrate should be cut 5. In place of the protective film 18, a plate-like protective member made of glass or a resin may be attached to the front face 3 side of the silicon wafer 11.

Figure 20:
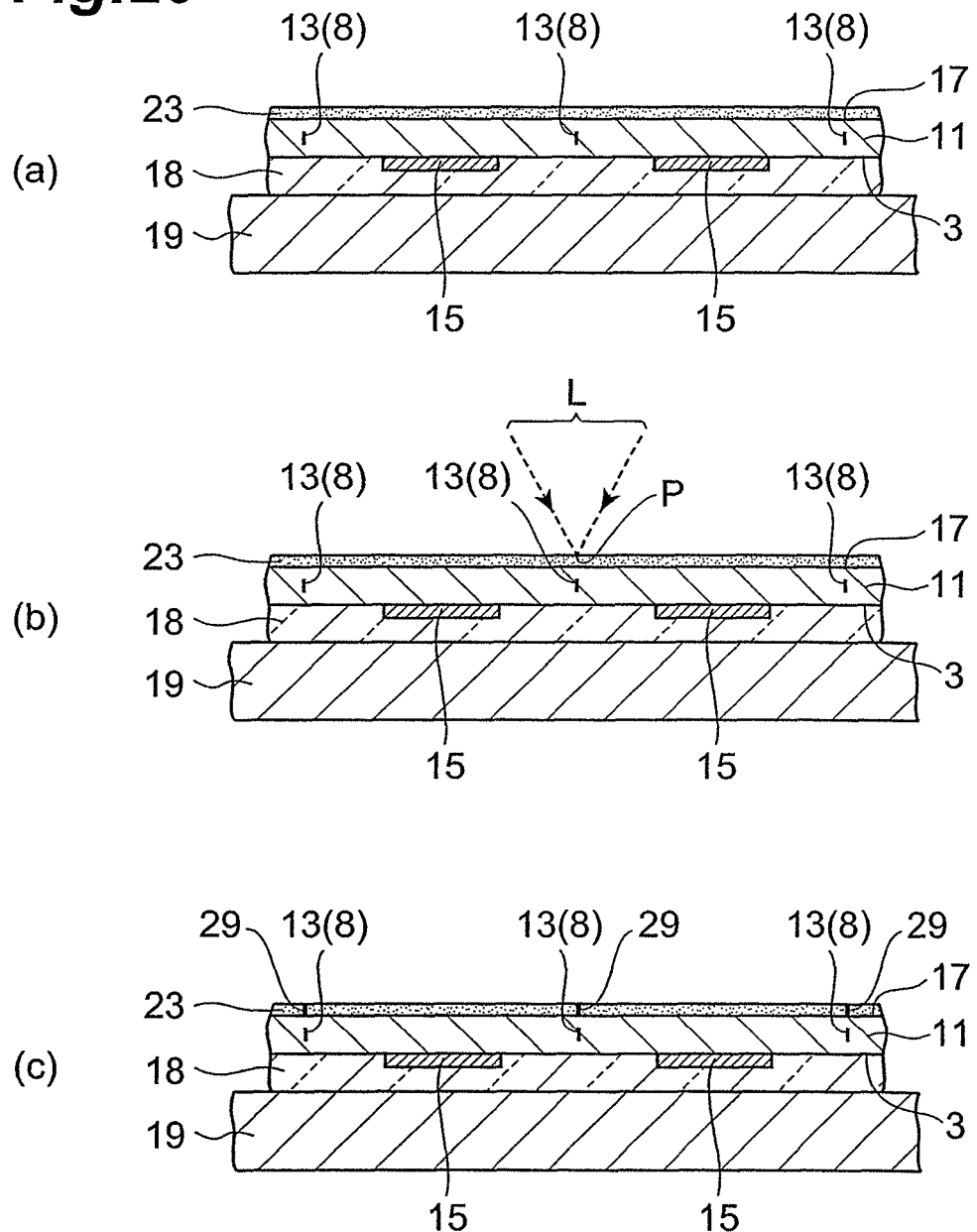
FIG. 20 is a schematic view for explaining the specific example of the semiconductor substrate cutting method in accordance with the embodiment, in which (a), (b), and (c) illustrate respective states where a die bonding resin layer is secured to the silicon wafer, the die bonding resin layer is irradiated with laser light, and the die bonding resin layer is formed with a modified region.

Subsequently, as shown in FIG. 20(*a*), a die bonding resin layer 23 is secured to the rear face 17 of the silicon wafer 11, and the protective film 18 is secured by vacuum suction onto the mounting table 19 of the laser processing apparatus such that the rear face 17 of the silicon wafer 11 faces up. Then, as shown in FIG. 20(*b*), the die bonding resin layer 23 is irradiated with laser light L having a predetermined wavelength (e.g., 808 nm) while positioning a light-converging point P therewithin, and the mounting table 19 is moved such that the light-converging point P is relatively moved along the line along which the substrate should be cut 5. Consequently, as shown in FIG. 20(*c*), a modified region 29 having such a property that it is easy to tear apart is formed in the die bonding resin layer 23 along the line along which the substrate should be cut 5. This modified region 29 is one having a physical property changed or weakened by a heating effect. The die bonding resin layer 23 may be irradiated along the line along which the substrate should be cut 5 with electron beams instead of the laser light L having a predetermined wavelength.

Subsequently, the silicon wafer 11 is removed from the mounting table 19 and, as shown in FIG. 21(*a*), an expansion film 21 is attached by way of an adhesive layer (an adhesive whose adhesion force weakens upon irradiation with UV rays and other energy beams) 31 to the die bonding resin layer 23 secured to the silicon wafer 11. The expansion film 21 with the adhesive layer 31 may be attached to the die bonding resin layer 23, or the expansion film 21 may be attached to the die bonding resin layer 23 after the adhesive layer 31 is laminated thereon.

Then, the protective film 18 is peeled off from the front face 3 side of the silicon wafer 11 as shown in FIG. 21(*b*), and marginal parts of the expansion film 21 are pulled outward as shown in FIG. 21(*c*), so as to expand the expansion film 21. As the expansion film 21 is expanded, a fracture occurs in the thickness direction from the starting point region for cutting 8 acting as a start region, and reaches the front face 3 and rear face 17 of the silicon wafer 11. This cuts the silicon wafer 11 accurately along the line along which the substrate should be cut 5, thereby yielding a plurality of semiconductor chips 25 each having one functional device 15. Here, opposing cut surfaces 25*a*, 25*a* of neighboring semiconductor chips 25, 25 are released from their close contact state as the expansion film 21 expands, whereby the die bonding resin layer 23 closely in contact with the rear face 17 of the silicon wafer 11 is cut along the line along which the substrate should be cut 5 simultaneously with the cutting of the silicon wafer 11.

Subsequently, the adhesive layer 31 is irradiated with UV rays or other energy beams, so as to lower its adhesion force, and the semiconductor chips 25 with their corresponding cut pieces of the die bonding resin layer 23 closely in contact therewith are successively picked up.

Another specific example of selectively heating the part of die bonding resin layer 23 along the line along which the substrate should be cut 5 will now be explained. Among the drawings, parts identical or equivalent to each other will be referred to with numerals identical to each other without repeating their overlapping descriptions.

Figure 22:
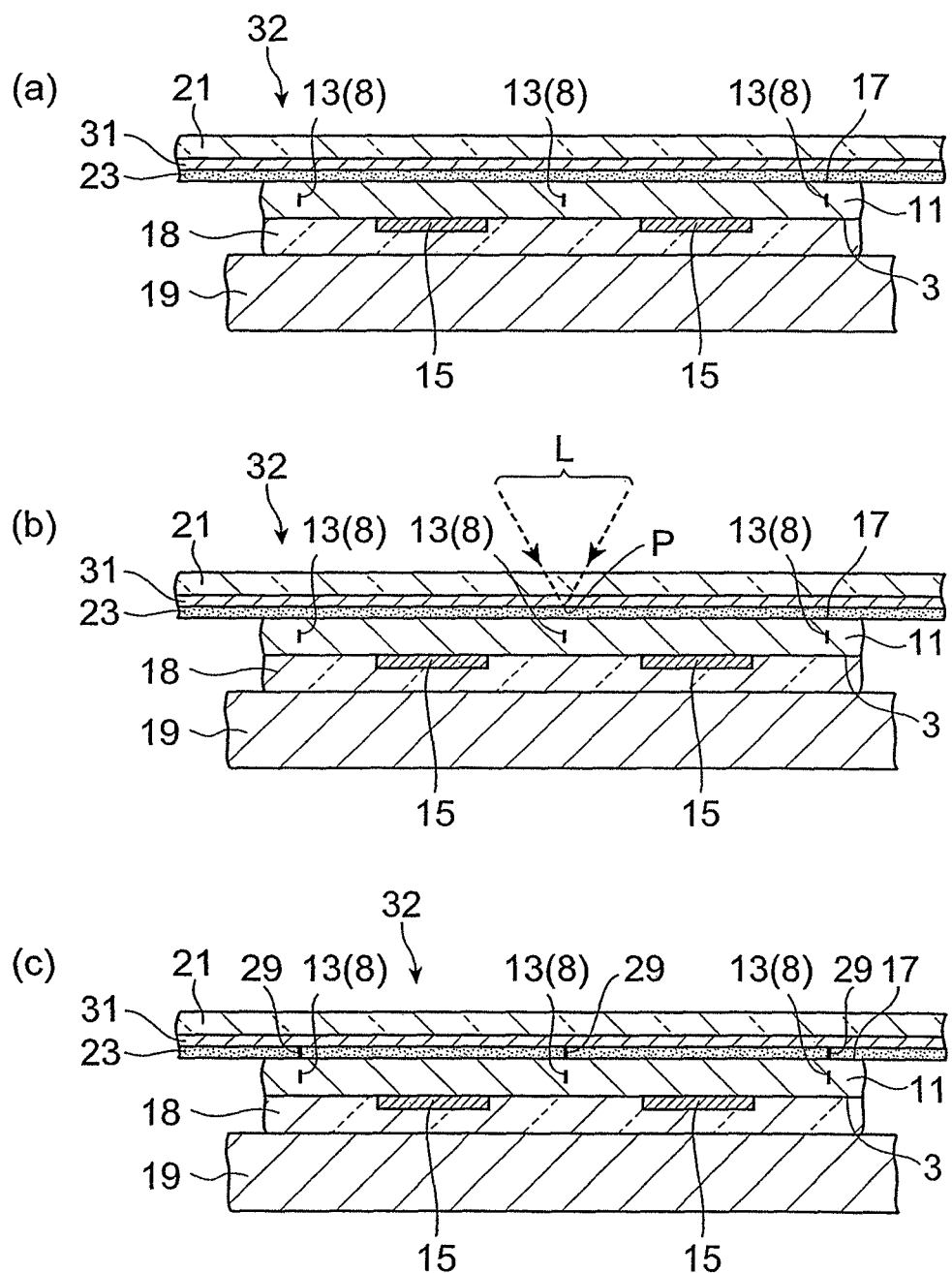
FIG. 22 is a schematic view for explaining another specific example of the semiconductor substrate cutting method in accordance with the embodiment, in which (a), (b), and (c) illustrate respective states where a die bonding resin bearing film is attached to the silicon wafer, the die bonding resin layer is irradiated with laser light, and the die bonding resin is formed with a modified region.

First, as in the specific example mentioned above, molten processed regions 13 form starting point regions for cutting 8 within the silicon wafer 11 along a line along which the substrate should be cut 5. Thereafter, as shown in FIG. 22(*a*), a die bonding resin bearing film 32 is attached to the rear face 17 of the silicon wafer 11, and the protective film 18 is secured by vacuum suction onto the mounting table 19 of the laser processing apparatus such that the rear face 17 of the silicon wafer 11 faces up. The die bonding resin bearing film 32 is one in which a die bonding resin layer 23 is disposed by way of an adhesive layer 31 on an expansion film 21 which is made of a material transmitting laser light L having a predetermined wavelength (e.g., 808 nm). As the die bonding resin bearing film 32, one in which the die bonding resin layer 23 is directly disposed on the expansion film 21 made of a material transmitting laser light L having a predetermined wavelength may be used as well (see, for example, Japanese Patent Publication No. 1987034).

After being attached, the die bonding resin bearing film 32 is irradiated with the laser light L while positioning a light-converging point P within the die bonding resin layer 23 as shown in FIG. 22(*b*), and the mounting table 19 is moved such that the light-converging point P is relatively moved along the line along which the substrate should be cut 5. Consequently, as shown in FIG. 22(*c*), a modified region 29 having such a property that it is easy to tear apart is formed in the die bonding resin layer 23 along the line along which the substrate should be cut 5.

Figure 23:
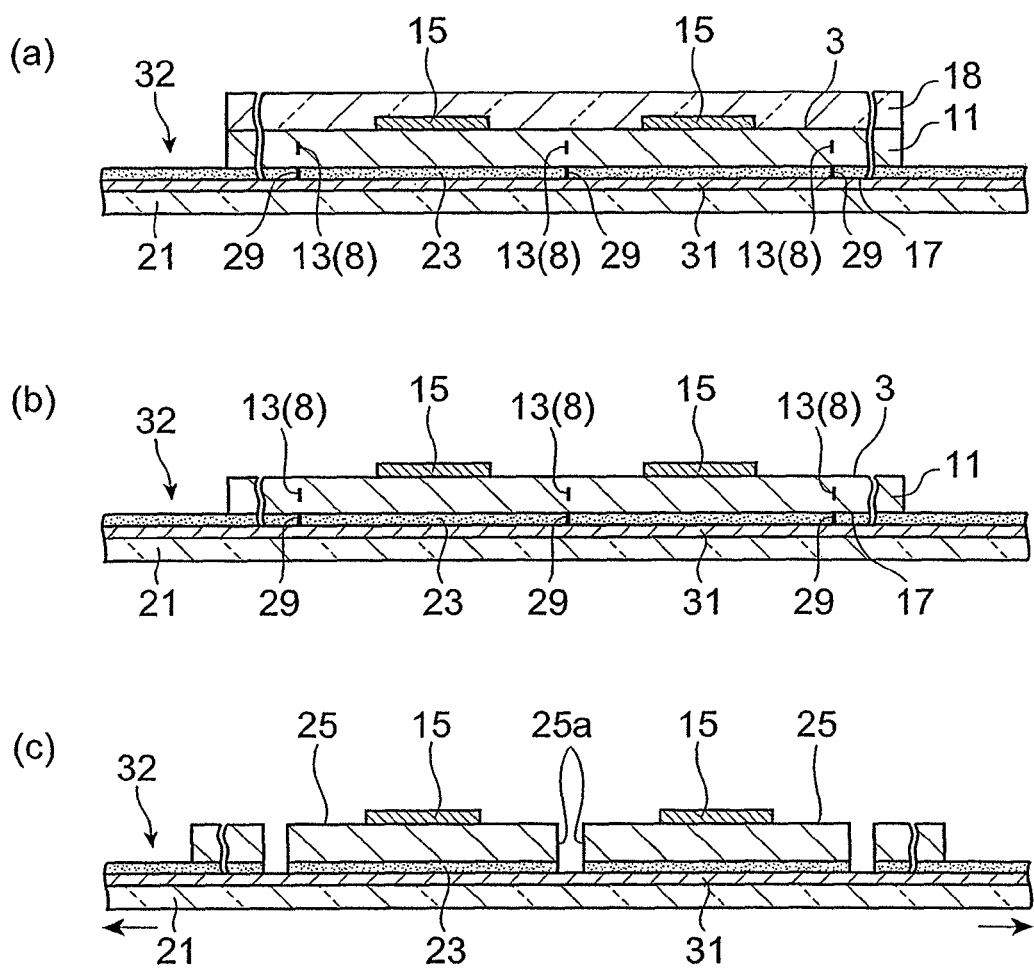
FIG. 23 is a view for explaining another specific example of the semiconductor substrate cutting method in accordance with the embodiment, in which (a), (b), and (c) illustrate respective states where the silicon wafer is removed from a mounting table of a laser processing apparatus, the protective film is peeled off from the silicon wafer, and the expansion film is expanded.

Subsequently, the protective film 18 is peeled off from the front face 3 side of the silicon wafer 11 as shown in FIGS. 23(*a*) and (*b*), and marginal parts of the expansion film 21 are pulled outward as shown in FIG. 23(*c*), so as to expand the expansion film 21. As the expansion film 21 is expanded, a fracture occurs in the thickness direction from the starting point region for cutting 8 acting as a start region, and reaches the front face 3 and rear face 17 of the silicon wafer 11. This cuts the silicon wafer 11 accurately along the line along which the substrate should be cut 5, thereby yielding a plurality of semiconductor chips 25 each having one functional device 15. Here, opposing cut surfaces 25*a*, 25*a* of neighboring semiconductor chips 25, 25 are released from their close contact state as the expansion film 21 expands, whereby the die bonding resin layer 23 closely in contact with the rear face 17 of the silicon wafer 11 is cut along the line along which the substrate should be cut 5 simultaneously with the cutting of the silicon wafer 11.

Subsequently, the adhesive layer 31 is irradiated with UV rays or other energy beams, so as to lower its adhesion force, and the semiconductor chips 25 with their corresponding cut pieces of the die bonding resin layer 23 closely in contact therewith are successively picked up. The adhesive layer 31 may be irradiated with UV rays or other energy beams either before or after expanding the expansion film 21.

Though the die bonding resin layer 23 is irradiated with laser light having a predetermined wavelength along the line along which the substrate should be cut 5 in each of the above-mentioned specific examples, a mask formed with a light-transmitting part along the line along which the substrate should be cut 5 may be disposed on the die bonding resin layer 23 or die bonding resin bearing film 32, and totally irradiated with UV rays or other energy beams, so as to form a modified region 29 in the die bonding resin layer 23 along the line along which the substrate should be cut 5.

INDUSTRIAL APPLICABILITY

In the present invention, as explained in the foregoing, a semiconductor substrate having a front face formed with a functional device can efficiently be cut together with a die bonding resin layer.

The invention claimed is:

1. A semiconductor substrate cutting method for cutting a semiconductor substrate having a front face formed with a plurality of functional devices into individual functional devices, so as to manufacture a semiconductor device comprising at least one of the functional devices, the method comprising the steps of:
   attaching a protective member to the front face of the semiconductor substrate, such that the functional devices are covered;
   irradiating the semiconductor substrate with laser light while positioning a light-converging point within the semiconductor substrate with a rear face of the semiconductor substrate acting as a laser light incident face after attaching the protective member, so as to form a plurality of modified regions, each modified region forming a starting point region for cutting along each of a plurality of lines along which the semiconductor substrate is to be cut, respectively, the lines set like a grid running between neighboring functional devices, inside by a predetermined distance from the laser light incident face, and cutting the semiconductor substrate into a plurality of semiconductor chips from the starting point regions along each of the lines in the grid;
   expanding an expandable holding member attached to an entirety of rear faces of the semiconductor chips by way of a die bonding resin layer, and thereby cutting the die bonding resin layer along each of cut surfaces of the semiconductor chips after forming the starting point regions, so as to obtain a the semiconductor chips each having a front face formed with a functional device and having a cut piece of the die bonding resin layer in close contact with the rear face thereof, wherein the die bonding resin layer simultaneously begins to be separated into pieces at the same time the semiconductor chips are separated from each other in response to expanding of the holding member; and
   mounting each semiconductor chip onto a support body by way of the cut piece of the die bonding resin layer in close contact with the rear face thereof, so as to obtain the semiconductor device.

2. A semiconductor substrate cutting method according to claim 1, wherein the support body is a lead frame.

3. A semiconductor substrate cutting method according to claim 1, wherein the holding member is expanded after the protective member is removed from the front face of the semiconductor substrate.

4. A semiconductor substrate cutting method according to claim 1, wherein the semiconductor substrate is cut into the semiconductor chips from the starting point regions along each of the lines after the holding member is attached to the rear face of the semiconductor substrate by way of the die bonding resin layer.

5. A semiconductor substrate cutting method according to claim 1, wherein the semiconductor substrate is cut into the semiconductor chips from the starting point regions along each of the lines before the holding member is attached to the entirety of the rear faces of the semiconductor chips by way of the die bonding resin layer.

6. A semiconductor substrate cutting method according to claim 1, further comprising a step of heating the die bonding resin layer before the step of cutting the die bonding resin layer along the lines along which the substrate is to be cut by expanding the holding member.

7. A method for manufacturing a semiconductor device by cutting a semiconductor substrate having a front face formed with a plurality of functional devices into individual functional devices, so as to manufacture the semiconductor device comprising at least one of the functional devices, the method comprising the steps of:
   attaching a protective member to the front face of the semiconductor substrate, such that the functional devices are covered;
   irradiating the semiconductor substrate with laser light while positioning a light-converging point within the semiconductor substrate with a rear face of the semiconductor substrate acting as a laser light incident face after attaching the protective member, so as to form a plurality of modified regions, each modified region forming a starting point region for cutting along each of a plurality of lines along which the semiconductor substrate is to be cut, respectively, the lines set like a grid running between neighboring functional devices, inside by a predetermined distance from the laser light incident face, and cutting the semiconductor substrate into a plurality of semiconductor chips from the starting point regions along each of the lines in the grid;
   expanding an expandable holding member attached to an entirety of rear faces of the semiconductor chips by way of a die bonding resin layer, and thereby cutting the die bonding resin layer along each of cut surfaces of the semiconductor chips after forming the starting point regions, so as to obtain the semiconductor chips each having a front face formed with a functional device and having a cut piece of the die bonding resin layer in close contact with the rear face thereof, wherein the die bonding resin layer simultaneously begins to be separated into pieces at the same time the semiconductor chips are separated from each other in response to expanding of the holding member; and
   mounting each semiconductor chip onto a support body by way of the cut piece of the die bonding resin layer in close contact with the rear face thereof, so as to obtain the semiconductor device.

8. A method for manufacturing the semiconductor device according to claim 7, wherein the support body is a lead frame.

9. A method for manufacturing the semiconductor device according to claim 7, wherein the holding member is expanded after the protective member is removed from the front face of the semiconductor substrate.

10. A method for manufacturing the semiconductor device according to claim 7, wherein the semiconductor substrate is cut into the semiconductor chips from the starting point regions along each of the lines after the holding member is attached to the rear face of the semiconductor substrate by way of the die bonding resin layer.

11. A method for manufacturing the semiconductor device according to claim 7, wherein the semiconductor substrate is cut into the semiconductor chips from the starting point regions along each of the lines before the holding member is attached to the entirety of the rear faces of the semiconductor chips by way of the die bonding resin layer.

12. A method for manufacturing the semiconductor device according to claim 7, further comprising a step of heating the die bonding resin layer before the step of cutting the die bonding resin layer along the lines along which the substrate is to be cut by expanding the holding member.

\* \* \* \* \*